United States Patent
Sakano et al.

(10) Patent No.: US 7,567,269 B2
(45) Date of Patent: Jul. 28, 2009

(54) TELEVISION PHONE ADAPTOR

(75) Inventors: Shinji Sakano, Kamakura (JP); Kanji Tabeya, Kooriyama (JP); Masahito Hirokawa, Sukagawa (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 658 days.

(21) Appl. No.: 11/115,111

(22) Filed: Apr. 27, 2005

(65) Prior Publication Data

US 2005/0243806 A1   Nov. 3, 2005

(30) Foreign Application Priority Data

Apr. 28, 2004  (JP)  ............... 2004-133256
May 12, 2004  (JP)  ............... 2004-141871
Mar. 8, 2005   (JP)  ............... 2005-063706

(51) Int. Cl.
  *H04N 7/14*  (2006.01)
  *H04L 12/66*  (2006.01)

(52) U.S. Cl. ............... 348/14.01; 348/14.03; 348/14.08

(58) Field of Classification Search ... 348/14.01–14.08, 348/14.1, 14.11–14.16; 370/252, 260–261, 370/352; 709/204
See application file for complete search history.

(56) References Cited

U.S. PATENT DOCUMENTS

| | | | | |
|---|---|---|---|---|
| 5,109,407 | A * | 4/1992 | Fujita et al. | 379/102.02 |
| 6,020,916 | A * | 2/2000 | Gerszberg et al. | 348/14.07 |
| 6,545,697 | B1 * | 4/2003 | Parker et al. | 348/14.01 |
| 2003/0039241 | A1 * | 2/2003 | Park et al. | 370/352 |

FOREIGN PATENT DOCUMENTS

| | | | | |
|---|---|---|---|---|
| JP | 06062142 | A | * | 3/1994 |
| JP | 2000013536 | A | * | 1/2000 |
| JP | 2000278390 | A | * | 10/2000 |
| JP | 2000-312262 | | | 11/2000 |

OTHER PUBLICATIONS

A Debut of a simple IP visual phone! Visual Phone Adapter (tentative title) [online], retrieved on Apr. 9, 2003, Internet http://www.suncomm.co.jp/vpa/index.html.
Sun Communications, An Adaptor for adding a moving picture function to an IP telephone [online], retrieved on Apr. 9, 2003, Internet http:bb.watch.impress.co.jp/cda/event/4162.html.

* cited by examiner

*Primary Examiner*—Melur Ramakrishnaiah
(74) *Attorney, Agent, or Firm*—Antonelli, Terry, Stout & Kraus, LLP.

(57) ABSTRACT

A television phone adapter which permits an ordinary analog telephone to switch between being a telephone with a video function and a telephone without a video function. The television phone adapter includes a telephone adapter unit that detects dial operation of an analog telephone connected to a router with an IP telephone function, a video adapter unit that connects and disconnects a video connection using an IP network, sends a video taken by a camera to a communication partner and outputs a video received from the communication partner to a display 4 through the video connection in the connected state. A translation table stores correspondence between dial operation and a setting content. A main control unit controls connection and disconnection of the video connection by the video adapter unit, according to setting/content items corresponding to dial numbers or dial tones detected by the telephone adapter unit, when the control content translation table stores the setting/content items corresponding to the dial numbers or tones detected by the telephone adapter unit.

15 Claims, 15 Drawing Sheets

FIG. 3

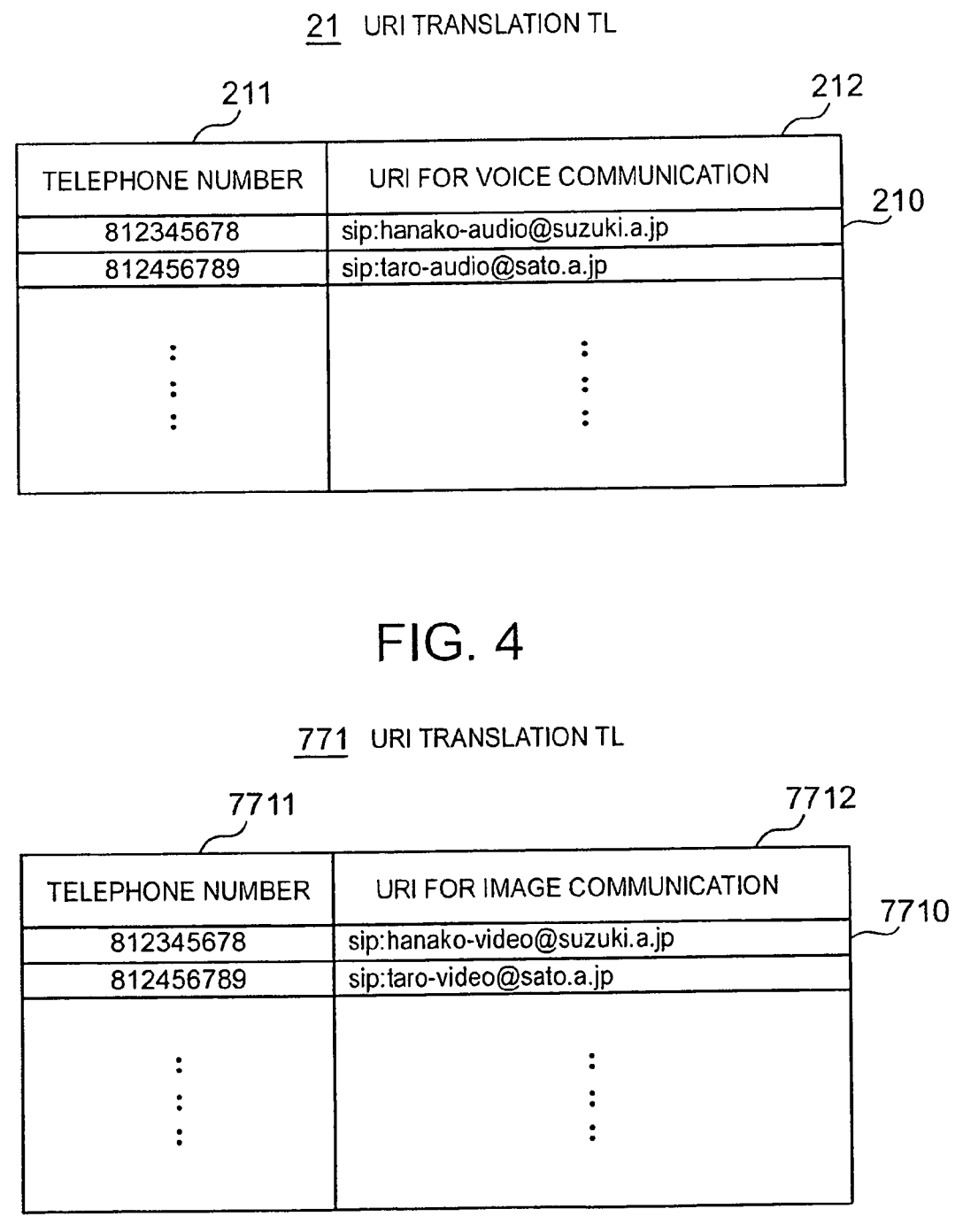

21 URI TRANSLATION TL

| TELEPHONE NUMBER (211) | URI FOR VOICE COMMUNICATION (212) |
|---|---|
| 812345678 | sip:hanako-audio@suzuki.a.jp |
| 812456789 | sip:taro-audio@sato.a.jp |
| ⋮ | ⋮ |

771 URI TRANSLATION TL

| TELEPHONE NUMBER (7711) | URI FOR IMAGE COMMUNICATION (7712) |
|---|---|
| 812345678 | sip:hanako-video@suzuki.a.jp |
| 812456789 | sip:taro-video@sato.a.jp |
| ⋮ | ⋮ |

30 CONTROL CONTENT TRANSLATION TL

| DIAL NUMBER | OPERATION MODE | SETTING/CONTROL ITEM |
|---|---|---|
| *, 1 | SETTING CONTROL MODE | TELEVISION PHONE AUTOMATIC MODE "ON" (AUTOMATIC ESTABLISHING OF AN IMAGE COMMUNICATION CONNECTION AT ESTABLISHING A VOICE COMMUNICATION CONNECTION) |
| *, 2 | SETTING CONTROL MODE | TELEVISION PHONE AUTOMATIC MODE "OFF" (ESTABLISHING OF AN IMAGE COMMUNICATION CONNECTION, SENDING OF AN IMAGE, MANUAL CONTROL OF DISPLAYING) |
| *, 3 | SETTING CONTROL MODE IP TELEPHONE MODE, TELEVISION PHONE MODE | ON/OFF SWITCHING OF CAMERA IMAGE DISPLAYING |
| *, 4 | SETTING CONTROL MODE | IMAGE COMMUNICATION CONNECTION AUTOMATIC DISPLAYING "ON" (AUTOMATIC DISPLAYING OF A RESULT OF ESTABLISHING AN IMAGE COMMUNICATION CONNECTION) |
| *, 5 | SETTING CONTROL MODE | IMAGE COMMUNICATION CONNECTION AUTOMATIC DISPLAYING "OFF" (MANUAL CONTROL OF DISPLAYING OF A RESULT OF ESTABLISHING AN IMAGE COMMUNICATION CONNECTION) |
| *, 6 | TELEVISION PHONE MODE | ON/OFF SWITCHING OF THE HOLD SCREEN |
| *, 7 | IP TELEPHONE MODE | IMAGE COMMUNICATION CONNECTION "ON" (ESTABLISHING AN IMAGE COMMUNICATION CONNECTION AND AUTOMATIC DISPLAYING OF A RESULT OF ESTABLISHING) |
| *, 8 | TELEVISION PHONE MODE | IMAGE COMMUNICATION CONNECTION "OFF" (DISCONNECTING AN IMAGE COMMUNICATION CONNECTION AND AUTOMATIC DISPLAYING OF A RESULT OF DISCONNECTING) |
| *, 9 | TELEVISION PHONE MODE | IMAGE SENDING/DISPLAYING "OFF" (STOP OF SENDING AN IMAGE TAKEN BY THE CAMERA AND DISPLAYING AN IMAGE SENT FROM THE PARTNER'S APPARATUS) |
| *, 0 | TELEVISION PHONE MODE | IMAGE SENDING/DISPLAYING "ON" (START OF SENDING AN IMAGE TAKEN BY THE CAMERA AND DISPLAYING OF AN IMAGE SENT FROM THE PARTNER'S APPARATUS) |
| *, #, 1 | SETTING CONTROL MODE | REMOTE CONTROL MODE "ON" (TRANSITION INTO THE STATE IN WHICH THE IMAGE SYSTEM CAN BE CONTROLLED BY PARTNER'S DIALING) |
| *, #, 2 | SETTING CONTROL MODE | REMOTE CONTROL MODE "OFF" (ENDING OF THE STATE IN WHICH THE IMAGE SYSTEM CAN BE CONTROLLED BY PARTNER'S DIALING) |
| *, #, 3 | TELEVISION PHONE MODE | IMAGE COMMUNICATION CONNECTION ONLY MODE (DISCONNECTION OF THE VOICE COMMUNICATION CONNECTION, WHILE MAINTAINING THE IMAGE COMMUNICATION CONNECTION ONLY) |
| *, #, 0 | TELEVISION PHONE MODE | IMAGE SENDING/DISPLAYING OF PARTNER'S APPARATUS "ON" (ASSUMING THE REMOTE CONTROL MODE OF THE PARTNER'S APPARATUS IS "ON") |
| *, #, 9 | TELEVISION PHONE MODE | IMAGE SENDING/DISPLAYING OF PARTNER'S APPARATUS "OFF" (ASSUMING THE REMOTE CONTROL MODE OF THE PARTNER'S APPARATUS IS "ON") |
| *, #, * | SETTING CONTROL MODE | ROUTER SETTING MODE "ON" (DISPLAYING OF THE ROUTER SETTING SCREEN) |
| *, #, 1, 0 | SETTING CONTROL MODE | ROUTER SETTING MODE "OFF" (ENDING OF DISPLAYING THE ROUTER SETTING SCREEN) |
| *, #, 1, 2 | SETTING CONTROL MODE | PORT ALLOCATION MODE (DISPLAYING OF THE PORT ALLOCATION SCREEN) |
| *, #, 1, 3 | SETTING CONTROL MODE | SECURITY SETTING MODE (DISPLAYING OF THE SECURITY SETTING SCREEN) |
| *, #, 1, 4 | SETTING CONTROL MODE | ADDRESS SETTING MODE (DISPLAYING OF THE ADDRESS SETTING SCREEN) |

FIG. 8

| STATE BEFORE TRANSITION | STATE AFTER TRANSITION | STATE AFTER TRANSITION | OPERATION CONTENT | OPERATION MODE AFTER TRANSITION | OPERATION CONTENT |
|---|---|---|---|---|---|
| H1 | ST-O | ST-A | ON-HOOK | SETTING/CONTROL | DIAL OPERATION WAIT |
| H2 | ST-A | ST-O | ON-HOOK | — | INCOMING CALL WAIT |
| H3 | ST-B | ST-O | ON-HOOK | — | DISCONNECTION OF VOICE COMMUNICATION CONNECTION, INCOMING CALL WAIT |
| H4 | ST-C | ST-O | ON-HOOK | — | DISCONNECTION OF VOICE AND IMAGE COMMUNICATION CONNECTIONS, INCOMING CALL WAIT |
| H5 | ST-D | ST-O | ON-HOOK | — | DISCONNECTION OF VOICE AND IMAGE COMMUNICATION CONNECTIONS, INCOMING CALL WAIT |
| T1 | ST-A | ST-E | DIAL OPERATION "*1, *2, *4, *5" | SETTING/CONTROL | TELEVISION PHONE AUTOMATIC MODE ON/OFF SETTING, OR, IMAGE COMMUNICATION CONNECTION AUTOMATIC DISPLAYING ON/OFF SETTING |
| T2 | ST-E | ST-A | — | SETTING/CONTROL | TRANSITION TO DIAL OPERATION WAIT AFTER SETTING |
| T3 | ST-A | ST-B | DIAL OPERATION "TELEPHONE NUMBER" | IP TELEPHONE | VOICE COMMUNICATION CONNECTION |
| T4 | ST-A | ST-F | DIAL OPERATION "*3, *#1, *#2" | SETTING/CONTROL | CAMERA IMAGE (SELF-IMAGE) DISPLAYING ON/OFF SWITCHING REMOTE CONTROL ON/OFF SETTING |
| T5 | ST-F | ST-A | — | SETTING/CONTROL | TRANSITION TO DIAL OPERATION WAIT AFTER SWITCHING |
| T6 | ST-B | ST-G | DIAL OPERATION "*3" | IP TELEPHONE | CAMERA IMAGE (SELF-IMAGE) DISPLAYING ON/OFF SWITCHING |
| T7 | ST-G | ST-B | — | IP TELEPHONE | TRANSITION TO DIAL OPERATION WAIT AFTER SWITCHING |
| T8 | ST-B | ST-C | DIAL OPERATION "*7" | TELEVISION PHONE | IMAGE COMMUNICATION CONNECTION |
| T9 | ST-B | ST-C | DIAL OPERATION "8" | TELEVISION PHONE | DISCONNECTION OF IMAGE COMMUNICATION CONNECTION |
| T10 | ST-C | ST-J | DIAL OPERATION "3" | TELEVISION PHONE | CAMERA IMAGE (SELF-IMAGE) DISPLAYING ON/OFF SWITCHING |
| T11 | ST-J | ST-C | — | TELEVISION PHONE | TRANSITION TO DIAL OPERATION WAIT AFTER SWITCHING |
| T12 | ST-C | ST-H | DIAL OPERATION "6" | TELEVISION PHONE | HOLD SCREEN DISPLAYING ON/OFF SWITCHING |
| T13 | ST-H | ST-C | — | TELEVISION PHONE | TRANSITION TO DIAL OPERATION WAIT AFTER SWITCHING |
| T14 | ST-C | ST-K | DIAL OPERATION "0, *9" | TELEVISION PHONE | SWITCHING OF START/STOP OF SENDING SELF-IMAGE AND DISPLAYING OF PARTNER'S IMAGE |
| T15 | ST-K | ST-C | — | TELEVISION PHONE | TRANSITION TO DIAL OPERATION WAIT AFTER SWITCHING |

FIG. 9

| STATE BEFORE TRANSITION | STATE AFTER TRANSITION | STATE AFTER TRANSITION | OPERATION CONTENT | OPERATION MODE AFTER TRANSITION | OPERATION CONTENT |
|---|---|---|---|---|---|
| T16 | ST-C | ST-D | DIAL OPERATION "*#3" | TELEVISION PHONE | DISCONNECTION OF VOICE COMMUNICATION CONNECTION, WHILE MAINTAINING IMAGE COMMUNICATION CONNECTION |
| T17 | ST-D | ST-C | DIAL OPERATION "TELEPHONE NUMBER" | TELEVISION PHONE | VOICE COMMUNICATION CONNECTION |
| T18 | ST-D | ST-N | DIAL OPERATION "*#3" | TELEVISION PHONE | CAMERA IMAGE (SELF-IMAGE) DISPLAYING ON/OFF SWITCHING |
| T19 | ST-N | ST-D | — | TELEVISION PHONE | TRANSITION TO DIAL OPERATION WAIT AFTER SWITCHING |
| T20 | ST-D | ST-L | DIAL OPERATION "*#6" | TELEVISION PHONE | HOLD SCREEN DISPLAYING ON/OFF SWITCHING |
| T21 | ST-L | ST-D | — | TELEVISION PHONE | TRANSITION TO DIAL OPERATION WAIT AFTER SWITCHING |
| T22 | ST-D | ST-M | DIAL OPERATION "*0,*9" | TELEVISION PHONE | SWITCHING OF START/STOP OF SENDING SELF-IMAGE AND DISPLAYING OF PARTNER'S IMAGE |
| T23 | ST-M | ST-D | — | TELEVISION PHONE | TRANSITION TO DIAL OPERATION WAIT AFTER SWITCHING |
| A1 | ST-O | ST-B | OFF-HOOK FOR INCOMING CALL | IP TELEPHONE | VOICE COMMUNICATION CONNECTION (TELEVISION PHONE AUTOMATIC MODE "OFF") |
| A2 | ST-B | ST-C | OFF-HOOK FOR INCOMING CALL | TELEVISION PHONE | VOICE COMMUNICATION CONNECTION AND IMAGE COMMUNICATION CONNECTION (TELEVISION PHONE AUTOMATIC MODE "O") |
| A3 | ST-C | ST-K | RECEPTION OF DIALING FROM PARTNER "*0, *9" | TELEVISION PHONE | SWITCHING OF START/STOP OF SENDING SELF-IMAGE AND DISPLAYING OF PARTNER'S IMAGE (REMOTE CONTROL MODE "ON") |
| A4 | ST-D | ST-K | RECEPTION OF DIALING FROM PARTNER "*0, *9" | TELEVISION PHONE | SWITCHING OF START/STOP OF SENDING SELF-IMAGE AND DISPLAYING OF PARTNER'S IMAGE (REMOTE CONTROL MODE "ON") |

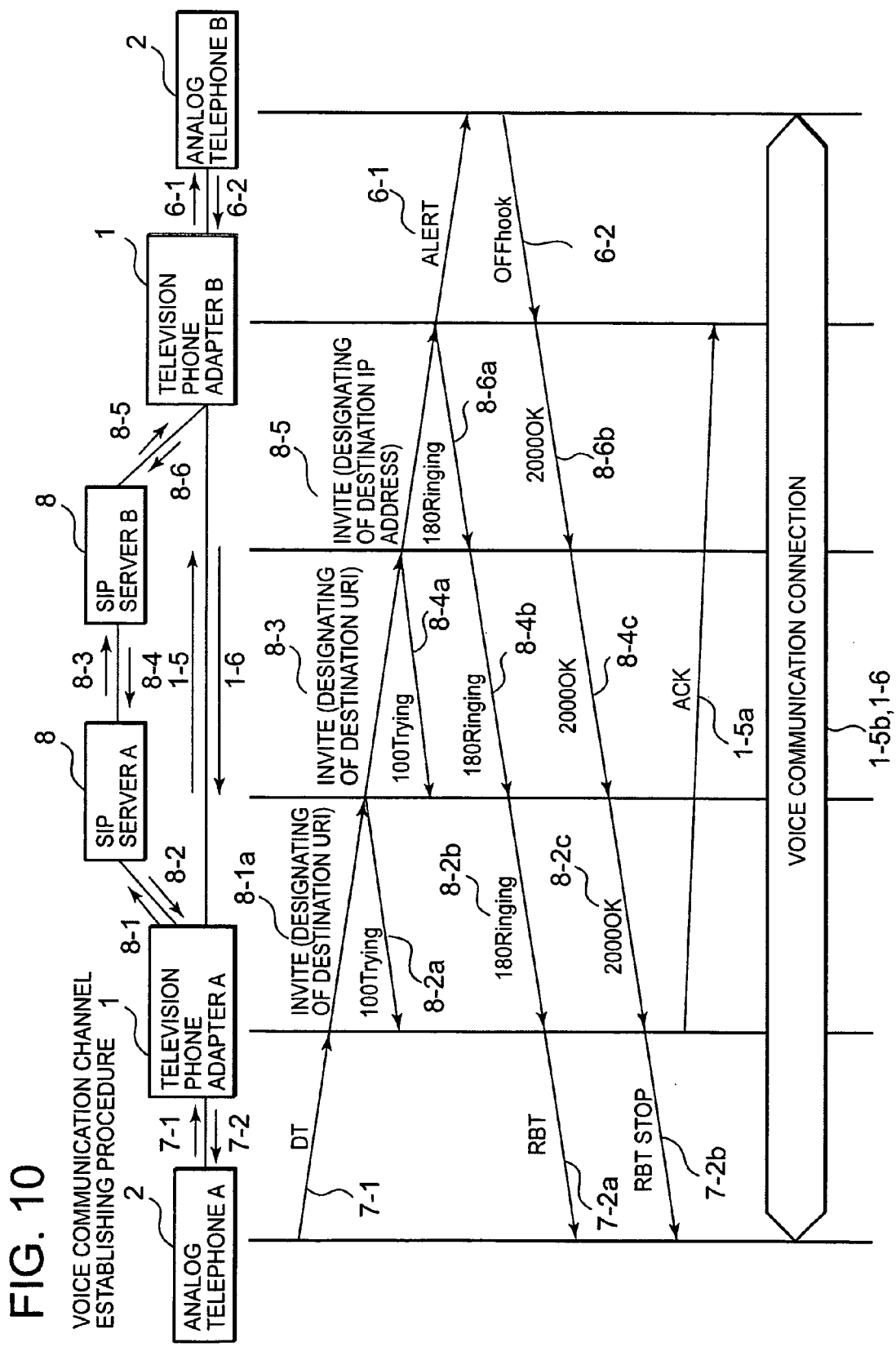

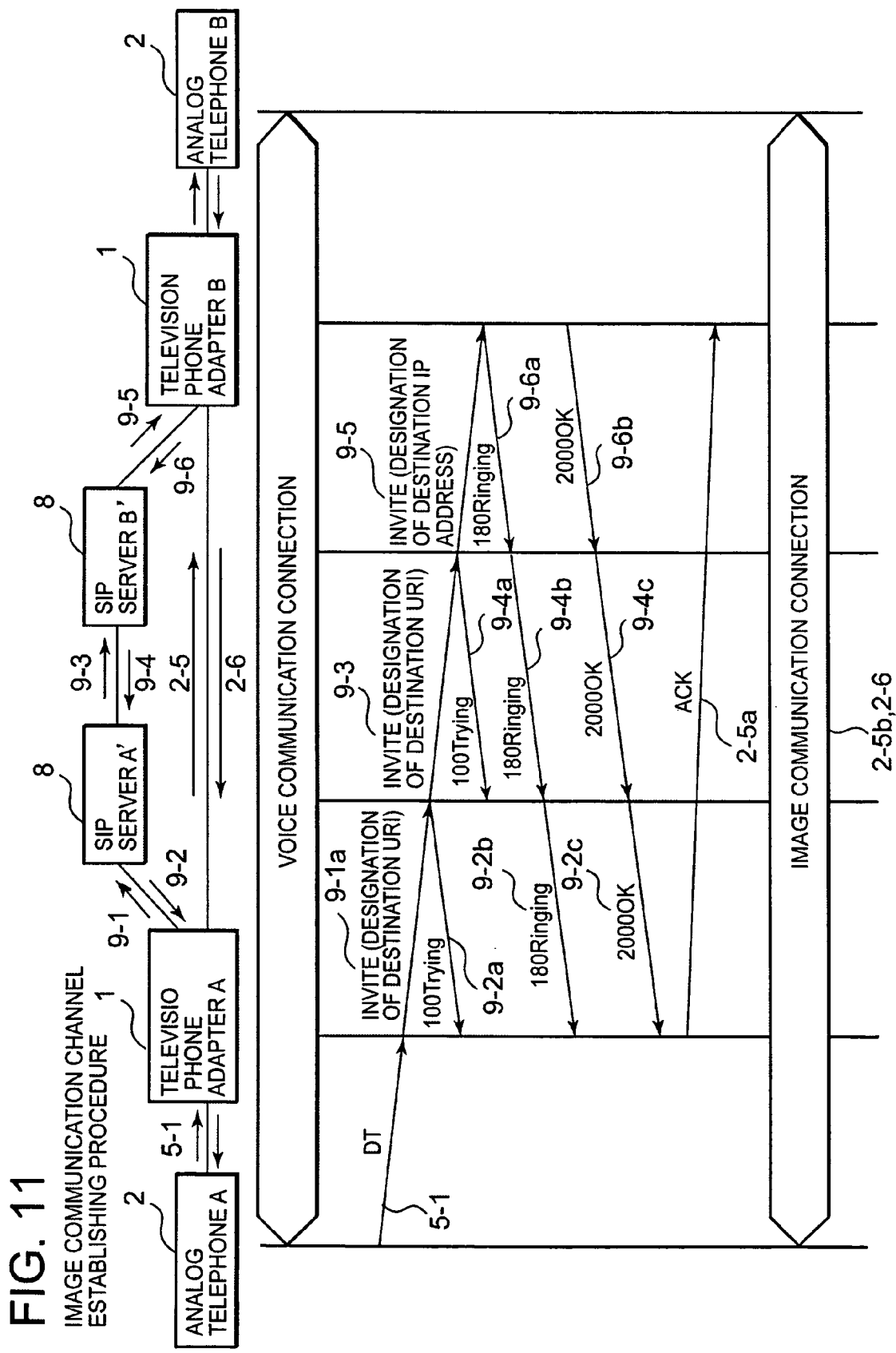

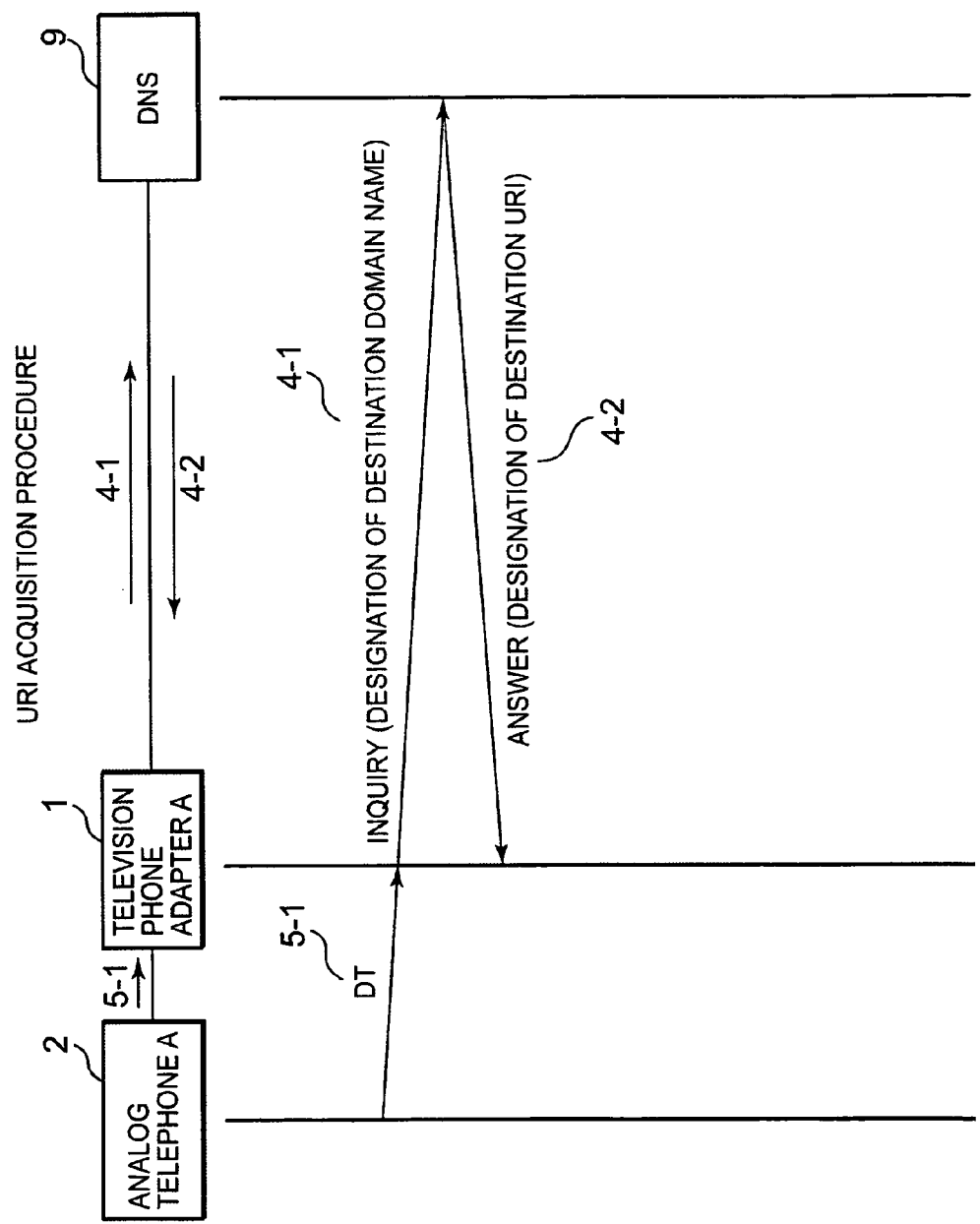

TELEVISION PHONE ADAPTOR

BACKGROUND OF THE INVENTION

The present invention relates to a television phone adapter that connects a telephone, a video input device, and a video output device to realize a television phone.

As digital networks, networks utilizing IP (Internet Protocol) are coming to the front. In particular, there appear broadband lines such as ADSL (Asymmetrical Digital Subscriber Line) and FTTH (Fiber To The Home) through which high-speed data communication is made possible, and now an IP network can use such a broadband line. An IP network uses a method called "best effort" that does not assure transfer of all data. In a best effort method, users share a band of a network. Accordingly, a cost for using the equipment is low, and a broadband line can be used at a low charge. Recently, taking such advantages, television phones utilizing an IP network is proposed.

"A Debut of a simple IP television phone! Television phone Adapter" (tentative title) [online], retrieved on Apr. 9, 2003, Internet <http://www.suncomm.co.jp/vpa/index.html> (hereinafter, referred to as "Non-Patent Document 1"), "Sun Communications, An adapter for adding a moving picture function to an IP telephone" [online], retrieved on Apr. 9, 2003, Internet <http://bb.watch.impress.co.jp/cda/event/4162.html> (hereinafter, referred to as "Non-Patent Document 2") and Sun Communications, Catalog, "Catalog—Television phone Adapter (tentative name)", April 2004 (hereinafter, referred to as "Non-patent Document 3") disclose a television phone adapter for using an ordinary analog telephone to realize a television phone. This television phone adapter is equipped with a liquid crystal display unit and a camera and connected with an analog telephone and an ADSL modem having an IP telephone adapter function. A simple button operation on the television phone adapter can switch from an IP telephone without video function to an IP telephone with video function (i.e., television phone) and vice versa. This television phone adapter realizes a television phone as follows. Namely, first, using the ADSL modem having the IP telephone adapter function, the television phone adapter establishes a connection for voice communication. Next, using this connection for voice communication, the television phone adapter exchanges IP addresses used for video communication with a communication partner. Then, using the exchanged IP addresses, the television phone adapter establishes a connection for video communication.

Further, Japanese Patent Laid-open No. 2000-312262 (hereinafter, referred to as "Patent Document 1") discloses a technique of using a key telephone as an input device for a computer. Here, a key telephone means a telephone having various functions for extension. A key telephone has various function keys in addition to fundamental dial keys 0-9, * and #. According to Patent Document 1, a key information extraction unit is arranged between a key telephone and a key telephone main unit. When key information is sent from the key telephone in an on-hook state, the key information extraction unit detects the key information and sends the key information to the computer. Using a translation table, the computer translates the key information received from the key information extraction unit into control information.

SUMMARY OF THE INVENTION

As described above, the television phone adapter described in Non-Patent Documents 1-3 uses a connection for voice communication in order to exchange IP addresses used for a connection for video communication with a communication partner. Then, using the exchanged IP addresses, the television phone adapter establishes a connection for video communication. In other words, IP addresses used for a connection for video communication are exchanged between television phone adapters directly (i.e., not through a server of an IP telephone service company). Accordingly, it is difficult for an IP telephone service company to grasp an IP network traffic state resulting from video communication connections, each of which generally requires a wider bandwidth in comparison with a connection for voice communication. As describe above, an IP network employs a best effort method. As a result, when an IP telephone service company can not grasp an IP network traffic state resulting from connections for voice communication and video communication, congestion occurs and data are discarded frequently, increasing a possibility of causing deterioration of the television phone.

Further, the television phone adapter described in Non-Patent Documents 1-3 is equipped with the liquid crystal display unit and the camera, and switching from the IP telephone without video function to the IP telephone with video function (i.e., television phone) or vice versa is performed using a button provided on the television phone adapter. In other words, it is assumed that this television phone adapter is placed in the neighborhood of a telephone, while it is not assumed that the television phone adapter is placed at a distance from a telephone. Further, it is possible to consider that the television phone adapter is connected with a key telephone, and the technique described in Non-Patent Document 1 is employed in order that the IP telephone without video function and the IP telephone with video function (i.e., television phone) can be switched through the key telephone. However, some analog telephones used in common families have only the fundamental dial symbols 0-9, * and #. Further, such an analog telephone outputs an analog signal, and thus can not use the computer control technique of the key telephone described in the cited document 1, which outputs a digital signal.

The present invention has been made taking the above state into consideration. An object of the present invention is to provide a television phone adapter of which an IP telephone service company can grasp states of connections for voice communication and video communication. Another object of the present invention is to provide a television phone adapter by which an ordinary analog telephone can accomplish switching from the telephone with video function to the telephone without video function or vice versa.

To solve the above problems, a first mode of the present embodiment provides a television phone adapter which transmits connection requests for a video communication connection and a voice communication connection respectively to servers existing on the IP network, whereby each of the video communication connection and the voice communication connection are establish via the servers existing on the IP network.

For example, the first mode of the present embodiment provides a television phone adapter which realizes a television phone using an IP network, comprising: a dial operation detection unit which detects dial operation of an analog telephone connected to an apparatus having an IP telephone function; and a video adapter unit which connects and disconnects a video communication connection using the IP network, sends a video received from a video input unit to a communication partner and outputs a video received from said communication partner to a video output unit through said video communication connection in a connected state, wherein said video adapter unit sends a video communication connection request whose destination number is a telephone number detected by said dial operation detection unit, to a certain server existing on the IP network.

Or, the first mode of the present invention provides a television phone adapter which realizes a television phone using an IP network, comprising: an IP telephone processing unit, which automatically connects and disconnects a voice communication connection using the IP network, sends voice received from an analog telephone to a communication partner and outputs voice received from said communication partner to said analog telephone through said voice communication connection in a connected state; a dial operation detection unit which detects dial operation of said analog telephone; and a video adapter unit which connects and disconnects a video communication connection using the IP network, sends a video received from a video input unit to a communication partner and outputs a video received from said communication partner to a video output unit through said video communication connection in a connected state; wherein said video adapter unit sends a video communication connection request whose destination number is a telephone number detected by said dial operation detection unit, to a certain server existing on the IP network.

Further, a second mode of the present invention provides a television phone adapter in which a translation table describing correspondence between dial operation and a setting content is prepared. This table is used for receiving designation of a setting content from a user who operates a dial of an analog telephone.

For example, the second mode of the present invention provides a television phone adapter which realizes a television phone using an IP network, comprising: a dial operation detection unit which detects dial operation of an analog telephone connected to an apparatus having an IP telephone function; a video adapter unit which connects and disconnects a video communication connection using the IP network, sends a video received from a video input unit to a communication partner and outputs a video received from said communication partner to a video output unit through said video communication connection in a connected state; a translation-table which describes correspondence between dial operation and a setting content; and a main control unit which controls connection and disconnection of said video communication connection by said video adapter unit, according to a setting content corresponding to the dial operation detected by said dial operation detection unit, when said translation table stores said setting content corresponding to said dial operation.

Or, the second mode of the present invention provides a television phone adapter which realizes a television phone using an IP network, comprising: an IP telephone processing unit, which automatically connects and disconnects a voice communication connection using the IP network, sends voice received from an analog telephone to a communication partner and outputs voice received from said communication partner to said analog telephone through said voice communication connection in a connected state; a dial operation detection unit which detects dial operation of said analog telephone; a video adapter unit connects and disconnects a video communication connection using the IP network, sends a video received from a video input unit to a communication partner and outputs a video received from said communication partner to a video output unit through said video communication connection in a connected state; a translation table that describes correspondence between dial operation and a setting content; and a main control unit that controls connection and disconnection of said video communication connection by said video adapter unit, according to a setting content corresponding to the dial operation detected by said dial operation detection unit, when said translation table stores said setting content corresponding to said dial operation.

BRIEF DESCRIPTION OF THE DRAWINGS

FIG. 3 is a diagram showing a URI translation TL 21 schematically;

FIG. 4 is a diagram showing a URI translation TL 771 schematically;

FIG. 5 is a diagram showing a control content translation TL 30 schematically;

FIG. 8 is a diagram for explaining occurrence conditions of the state transition shown in FIG. 7;

FIG. 9 is a diagram for explaining occurrence conditions of the state transition shown in FIG. 7;

FIG. 10 is a diagram for explaining a voice communication connection establishing procedure of the television phone service system shown in FIG. 1;

FIG. 11 is a diagram for explaining a video communication connection establishing procedure of the television phone service system shown in FIG. 1;

FIG. 12 is a diagram for explaining a procedure for a SIP processing unit 77 of the television phone adapter 1 to acquire a communication partner's URI used for video communication, from a DNS 9;

DETAILED DESCRIPTION OF THE PREFERRED EMBODIMENTS

First Embodiment

As a first embodiment of the present invention, will be described a television phone adapter that realizes an IP telephone without video function and IP telephone with video function (i.e., television phone).

Figure 1:
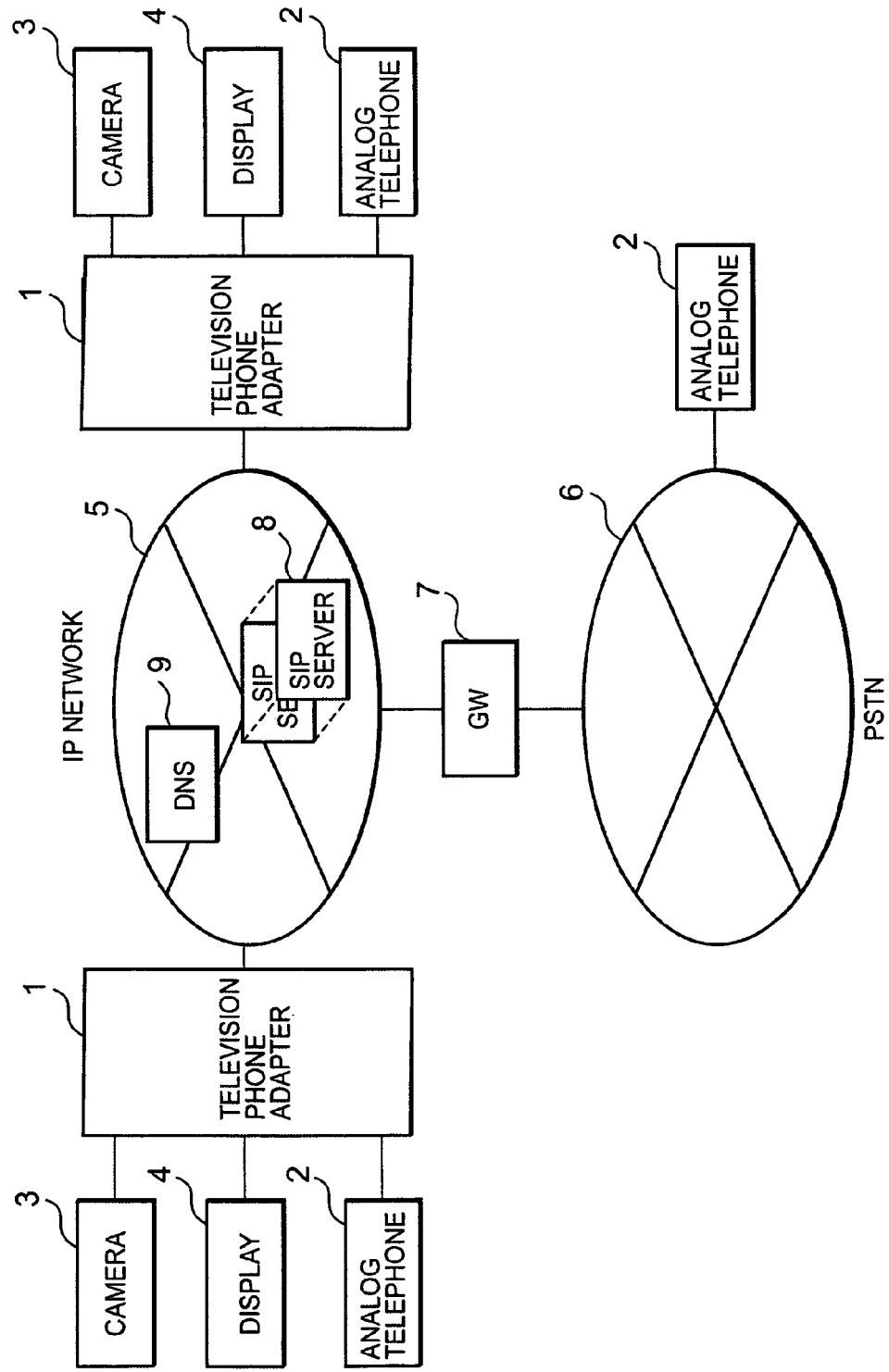
FIG. 1 is schematic diagram showing a television phone service system using a television phone adapter according to a first embodiment of the present invention.

FIG. 1 is a schematic diagram showing a television phone service system using a television phone adapter according to the first embodiment of the present invention.

As shown in the figure, a television phone adapter 1 communicates voice and video through an IP network 5 comprising a plurality of SIP (Session Initiation Protocol) servers 8. A television phone adapter 1 is connected with an analog telephone 2, a camera 3 and a display 4. The IP network 5 is connected with a PSTN (Public Switched Telephone Network) 6 through a GW (gateway) 7. The PSTN 6 is connected with an analog telephone 2 directly (i.e., not through a television phone adapter 1).

A television phone adapter 1 operates either in an IP-telephone-without-video-function mode or in an IP-telephone-with-video-function mode. In the following, the IP-telephone-without-video-function mode is simply referred to as the IP telephone mode, and the IP-telephone-with-video-function mode as the television phone mode.

In the case of the IP telephone mode, a television phone adapter 1 establishes a voice communication connection with another television phone adapter 1 or the GW 7 that accommodates a communication partner (an analog telephone 2) for the analog telephone 2 accommodated by the television phone adapter 1 itself through at least one SIP server 8 on the IP network 5. Then, through this voice communication connection, the television phone adapter 1 exchanges voice signals between the analog telephone 2 accommodated by the television phone adapter 1 itself and the communication partner. In the case where the apparatus that accommodates the communication partner is a GW 7, the GW 7 establishes a voice communication connection with the communication partner through the PSTN 6. Then, using this voice communication connection and the voice communication connection established with the television phone adapter 1 through the IP network 5, the analog telephone 2 accommodated by the television phone adapter 1 exchanges voice signals with the analog telephone 2 connected to the PSTN 6. Here, operation of the GW 7 is similar to the operation of the conventional GW that connects an IP telephone and an ordinary telephone.

On the other hand, in the case of the television phone mode, a television phone adapter 1 establishes a video communication connection through at least one SIP server 8 on the IP network 5, in addition to the above-mentioned voice communication connection. Then, through this video communication connection, the television phone adapter 1 sends a video signal obtained through the camera 3 accommodated by the television phone adapter 1 itself and displays a video signal sent from a communication partner on the display 4 accommodated by the television phone adapter 1 itself. The television phone adapter 1 of the present embodiment switches from the IP telephone mode to the television phone mode or vice versa based on dial operation on the analog telephone accommodated by the television phone adapter 1 itself.

Figure 2:
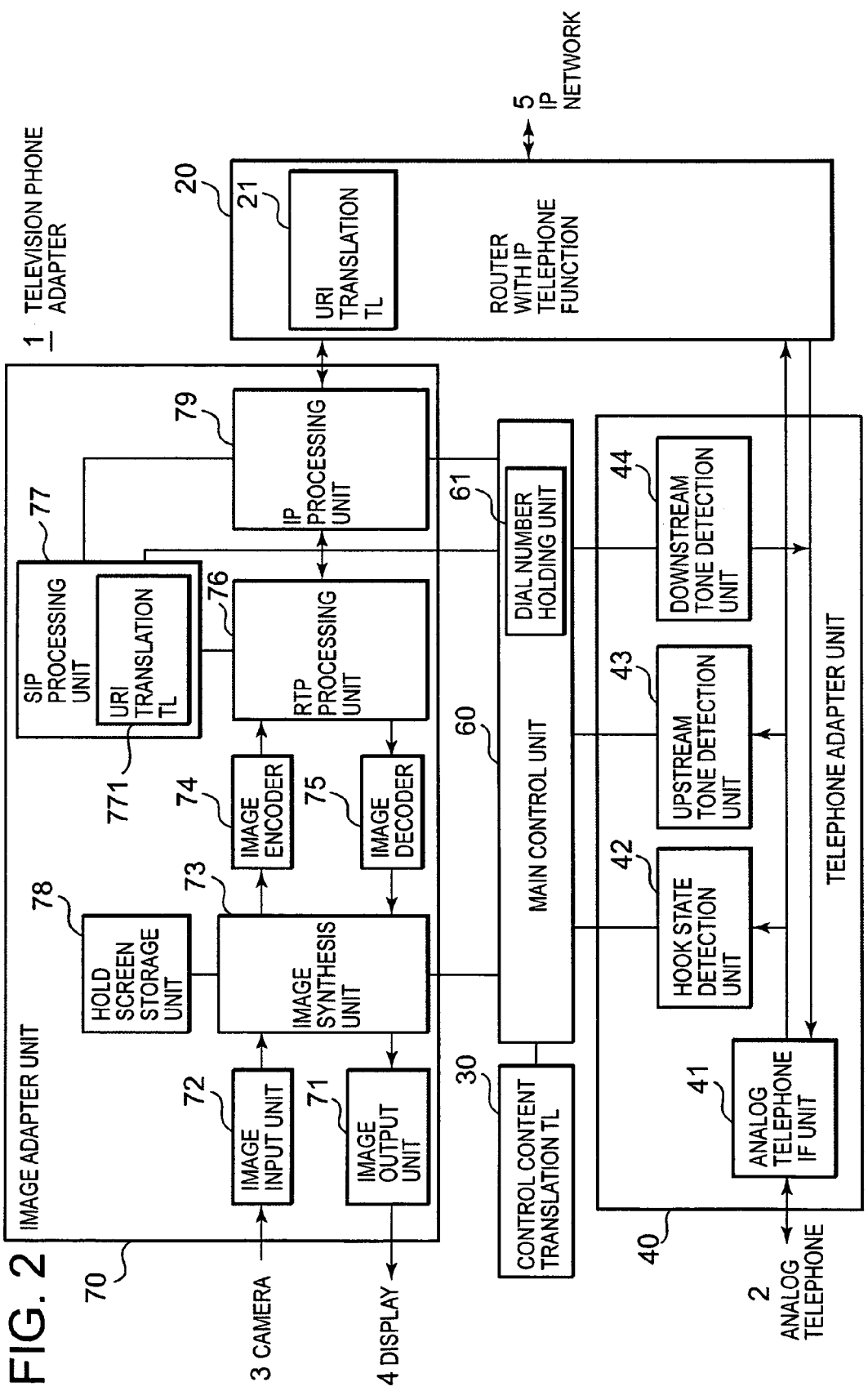
FIG. 2 is a schematic block diagram showing the television phone adapter 1.

FIG. 2 is a schematic block diagram showing a television phone adapter 1.

As shown in the figure, a television phone adapter 1 comprises a router with an IP telephone function 20, a telephone adapter unit 40 which connects an analog telephone 2 to the router with the IP telephone function 20, a video adapter unit 70 which connects a camera 3 and a display 4 to the router with the IP telephone function 20, a main control unit 60, and an control content translation TL (table) storage unit 30.

The router with the IP telephone function 20 is a router having a function of processing establishment of an IP telephone connection (call connection) according to SIP and a function of processing talking according to RTP (Real-time Transport Protocol).

The router with the IP telephone function 20 has a URI translation TL 21 for translating a telephone number into a URI (Uniform Resource Identifier). FIG. 3 is a diagram showing the URI translation TL 21 schematically. As shown in the figure, in the URI translation TL 21, a field 211 for registering a telephone number and a field 212 for registering a URI for voice communication corresponding to the telephone number form a record 210. Using the URI translation TL 21, the router with the IP telephone function 20 translates a telephone number (which is notified from the analog telephone 2 through the telephone adapter unit 40) into a URI. Then, the router 20 sends SIP packets containing a call connection request designating this URI as a communication partner to a predetermined SIP server 8 on the IP network 5. Then, the router 20 exchanges SIP packets containing call control information with the communication partner, and controls a connection (voice communication connection) used for exchanging RTP packets with the communication partner.

Further, the router with the IP telephone function 20 has a port (called a modular cable port or a telephone port, for example) for connecting an analog telephone 2 and a port (called a LAN cable port or an IP terminal port, for example) for connecting an IP terminal such as a PC (Personal Computer). The telephone adapter unit 40 is connected to the telephone port and the video adapter unit 70 is connected to the IP terminal port. A conventional device on the market may be used as the router with the IP telephone function 20 of the present embodiment. In that case, the router with the IP telephone function 20 may be an external device.

In the router with the IP telephone function 20 of the present embodiment, a junction of the telephone port and the IP network 5 is terminated, while a junction of the IP terminal port and the IP network 5 is not terminated but a bridge connection. This prevents a problem that a global IP address is terminated at the router with the IP telephone function 20 and thus the video adapter unit 70 can not perform the SIP processing. However, in the case where there is a one-to-one correspondence between a global IP address of the router with the IP telephone function 20 and a local IP address of the video adapter unit 70, the junction of the IP terminal port and the IP network 5 may be terminated. Further, also in the case where the SIP processing is partly modified so that the video adapter unit 70 can use a sub IP address, the junction of the IP terminal port and the IP network 5 can be terminated.

The telephone adapter unit 40 comprises an analog telephone IF (interface) unit 41, a hook state detection unit 42, an upstream tone detection unit 43, and a downstream tone detection unit. The analog telephone IF unit 41 is an interface for connecting an analog telephone 2 to the router with the IP telephone function 20. The hook state detection unit 42 detects an off-hook/on-hook state of the analog telephone 2 connected to the analog telephone IF unit 41, and sends a hook state signal indicating the detection result to the main control unit 60. The upstream tone detection unit 43 detects various tones (DT:dial tone, RBT:ring back tone, and BT:busy tone) sent from the analog telephone 2 connected to the analog telephone IF unit 41, and sends these tones to the main control unit 60. The downstream tone detection unit 44 detects various tones (DT, RBT and BT) sent from the router with the IP telephone function 20 to the analog telephone 2 connected to the analog telephone IF unit 41, and sends these tones to the main control unit 60.

The video adapter unit 70 comprises a video output unit 71, a video input unit 72, a video processing unit 73, a video encoder 74, a video decoder 75, an RTP processing unit 76, a SIP processing unit 77, a hold screen storage unit 78 and an IP processing unit 79.

The video output unit 71 performs D/A conversion of a video signal outputted from the video processing unit 73 and outputs the converted signal to the display 4. The video input unit 72 performs A/D conversion of a video signal received from the camera 72 and inputs the converted signal to the video processing unit 73. Further, the hold screen storage unit 78 stores hold screen data.

Based on at least one of video signals outputted from the video input unit 72, the hold screen storage unit 78 and the video decoder 75, the video processing unit 73 synthesizes a video signal to be sent, and outputs the synthesized signal to the video encoder 74. Further, based on at least one of video signals outputted from the video input unit 72, the hold screen storage unit 78 and the video decoder 75, the video processing unit 73 synthesizes a video signal to be displayed, and outputs the synthesized signal to the video output unit 71.

The video encoder 74 encodes the video signal synthesized by the video processing unit 73 and outputs the encoded signal to the RTP processing unit 76. The video decoder 75 decodes a video signal outputted from the RTP processing unit 76 and outputs the decoded signal to the video processing unit 73.

The RTP processing unit 76 prepares RTP packets from the video signal encoded by the video encoder 74, and outputs the packets to the IP processing unit 79. Further, the RTP processing unit 76 extracts a video signal from RTP packets outputted from the IP processing unit 79, and outputs the extracted video signal to the video decoder 75.

The SIP processing unit 77 has a URI translation TL 771 which translates a telephone number into a URI (Uniform Resource Identifier). FIG. 4 is a diagram showing the URI translation TL 771 schematically. As shown in the figure, in the URI translation TL 771, a field 7711 which registers a telephone number and a field 7712 which registers a URI for video communication corresponding to the telephone number form a record 7710.

Using the URI translation TL 771, the SIP processing unit 77 translates a telephone number (which is notified from the main control unit 60) into a URI, and sends SIP packets containing a call connection request designating this URI as a communication partner to a predetermined SIP server 8 on the IP network 5 through the IP processing unit 79. Then, the SIP processing unit 77 exchanges SIP packets containing call control information with the communication partner and controls a connection (video communication connection) used by the RTP processing unit 76 which exchanges RTP packets with the communication partner.

The IP processing unit 79 puts RTP packets received from the RTP processing unit 76 and SIP packets received from the SIP processing unit 77 into IP packets, and outputs the IP packets to the router with the IP telephone function 20. Further, the IP processing unit 79 extracts RTP packets and SIP packets from IP packets received from the router with the IP telephone function 20, and outputs the extracted RTP packets and SIP packets to the RTP processing unit 76 and the SIP processing unit 77.

The control content translation TL 30 stores correspondence between a dial number (which is a combination of at least two dial symbols) and a control content. FIG. 5 is a diagram showing the control content TL 30 schematically. As shown in the figure, a field 301 which registers a dial number, i.e., a combination of at least two dial symbols, a field 302 which registers an operation mode (status) of the television phone adapter 1 and a field 303 which registers a control content (setting/control item) corresponding to the dial number form a record 300. Here, the field 301 registers a dial number that is not used as a telephone number. Further, the field 302 registers one of the IP telephone mode, the television phone mode and a setting/control mode. Here, the setting/control mode means an off-hook state where neither voice communication connection nor video communication connection is established.

According to the control content translation TL 30, the main control unit 60 controls the video adapter unit 70 and the router with the IP telephone function 20, based on the hook state signal and a DT signal of the analog telephone 2 accommodated by the television phone adapter 1 itself and a DT signal of a communication partner. Here, the hook state signal and the DT signal of the analog telephone 2 are outputted from the telephone adapter 40.

The main control unit 60 specifies the dial number from a DT signal of the analog telephone accommodated by the television phone adapter 1 itself and judges whether the specified dial number is a number string used as a telephone number. For example, it is judged whether the specified dial number is a number string used as a telephone number by judging whether the number of digits of the specified dial number coincides with the number of digits of a number string used as a telephone number. In the case where the specified dial number is a number string used as a telephone number, this dial number is held in a dial number holding unit 61 in the main control unit 60. Then, when it is required to establish a video communication connection, this dial number is notified to the SIP processing unit 77 to instruct the SIP processing unit 77 to establish a video communication connection.

In the case where the dial number specified from the DT signal of the analog telephone accommodated by the television phone adapter 1 itself is not a number string used as a telephone number or a dial number specified from a DT signal of the communication partner is not a number string used as a telephone number, the main control unit 60 searches the control content translation TL 30 for a record 300 whose field 301 registers the specified dial number. When such a record 300 is retrieved, the main control unit 60 examines whether the operation mode of the television phone adapter 1 coincides with the operation mode registered in the field 302 of the record 300. When those modes coincide, the main control unit 60 controls the video adapter unit 70 and the router with the IP telephone function 20 according to the setting/control item registered in the field 303 of the record 300. In FIG. 5, for example, when the DT signal received from the telephone adapter unit 40 is "*1" and the operation mode of the television phone adapter 1 is the "setting/control mode", then the main control unit 60 sets a television phone automatic mode to "ON". Here, the main control unit 60 judges the operation mode of the television phone adapter 1, based on the states of the voice communication connection and the video communication connection.

Next, will be described operation of the television phone adapter 1 on the assumption that the control content translation TL 30 registers the contents shown in FIG. 5.

Figure 6:
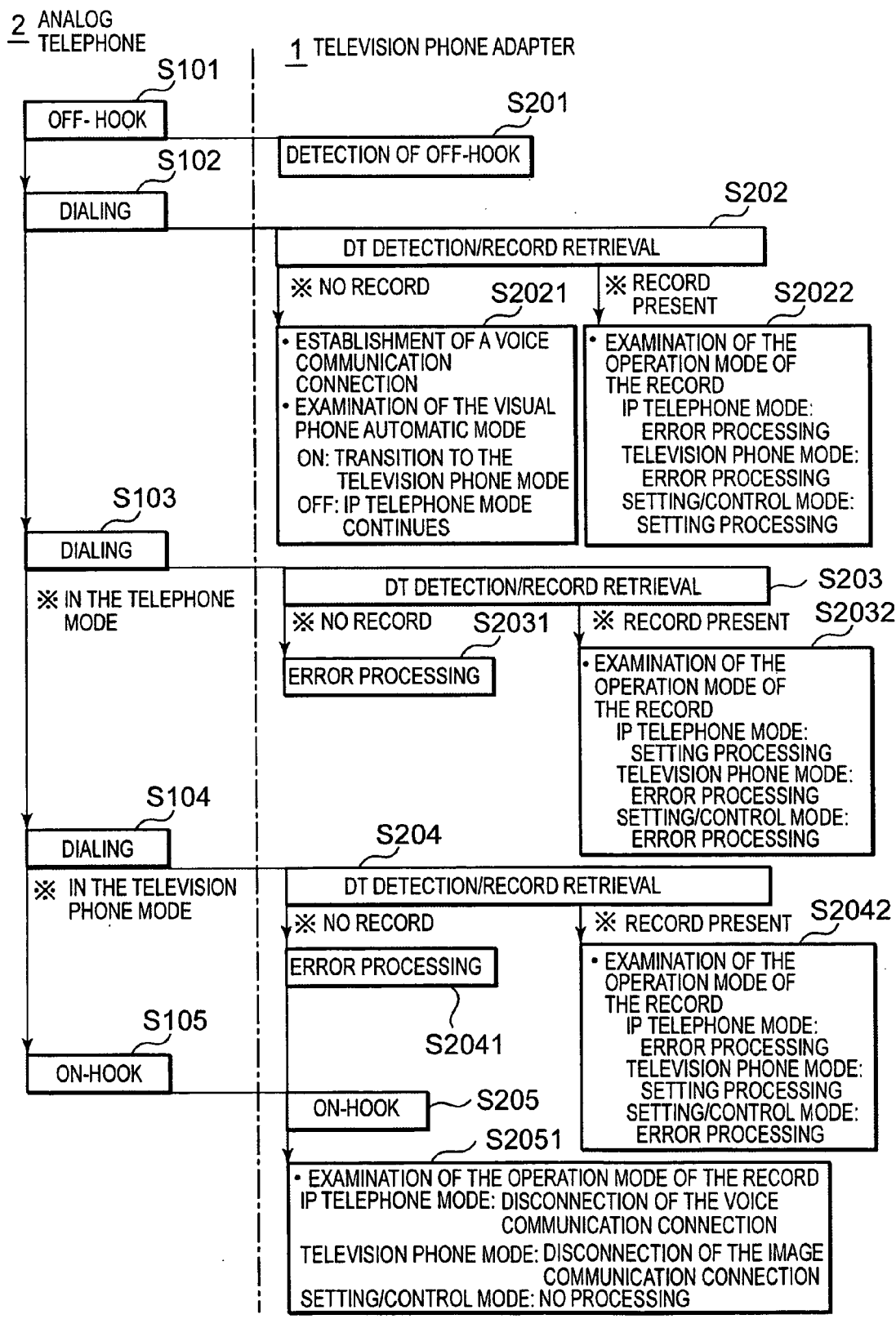
FIG. 6 is a diagram for explaining a procedure of the television phone adapter 1.

FIG. 6 is a diagram for explaining a procedure of the television phone adapter 1.

First, when the analog telephone 2 is made off-hook (S101), the hook state detection unit 42 detects this through the analog telephone IF unit 41, and sends a hook state signal indicating the off-hook state to the main control unit 60 (S201).

Next, when the dial of the analog telephone 2 is operated (S102), the tone detection unit 43 detects DT through the analog telephone IF unit 41, and sends the DT signal to the main control unit 60. Receiving the DT signal, the main control unit 60 specifies the dial number indicated by DT, and uses the specified dial number as a key for searching the control content translation TL 30 for a record 300 (S202).

When a record 300 can not be retrieved in S202, the specified dial number is a destination telephone number of the IP telephone. In that case, the router with the IP telephone function 20 establishes a voice communication connection with the destination of the IP telephone. This enables voice communication between the analog telephone 2 and the destination of the IP telephone. On the other hand, the main control unit 60 holds the specified dial number (the telephone number of the destination of the IP telephone) in the dial number holding unit 61. Further, based on RBT, BT or the like outputted by the router with the IP telephone function 20 and detected by the tone detection unit 44, the main control unit 60 detects that the router with the IP telephone function 20 has established the voice communication connection, and change the operation mode of the television phone adapter 1 into the IP telephone mode.

At that time, when the television phone automatic mode (which is set in the main control unit 60 itself) is "ON", then the main control unit 60 notifies the SIP processing unit 77 in the video adapter unit 70 of the IP telephone destination's telephone number held in the dial number holding unit 61 to request the SIP processing unit 77 to establish a video communication connection. Receiving the notification, the SIP processing unit 77 uses the URI translation TL 771 to translate the notified telephone number into a URI assigned to a video adapter unit 70 (an IP processing unit 79) of a television phone adapter 1 that accommodates the destination analog telephone 2. Then, the SIP processing unit 77 sends a video communication connection establishment request directed to that URI to a predetermined SIP server 8 on the IP network 5. As a result, in addition to the voice communication connection, a video communication connection with the visual adapter 1 that accommodates the analog telephone 2 as the destination is established. When both the voice communication connection and video communication connection are established, the main control unit 60 changes the operation mode of the television phone adapter 1 into the television phone mode (S2021).

On the other hand, when a record 300 can be retrieved in S202, the specified dial number is a code for controlling the television phone adapter 1. In that case, the main control unit 60 examines the operation mode registered in the field 302 of the retrieved record 300 to judge whether that operation mode coincides with the current operation mode of the television phone adapter 1. Here, neither voice communication connection nor video communication connection has not been established, and thus the operation mode of the television phone adapter is the setting/control mode. Thus, in the case where the operation mode registered in the field 302 of the retrieved record 300 is other than the setting/control mode, a predetermined error processing such as "ignoring" or "beeping from a speaker (not shown) provided to the television phone adapter 1" is performed. Only in the case where the operation mode registered in the field 302 of the retrieved record 300 is the setting/control mode, the main control unit 60 controls the video adapter unit 70 and the router with the IP telephone function 20 according to the setting/control item registered in the field 303 of the retrieved record 300 (S2022).

For example, in the case where the specified dial number is "*1", then the television phone automatic mode is set to "ON" for establishing a video communication connection in parallel with establishment of a voice communication connection. In the case where the specified dial number is "*2", then the television phone automatic mode is set to "OFF". Further, in the case where the specified dial number is "*4", video communication connection automatic displaying is set to "ON" for automatically displaying establishment of a video communication connection on a display unit (not shown) of the television phone adapter 1. Further, in the case where the specified dial number is "*#1", a remote control mode for control from a communication partner of the IP telephone is set to "ON". And, in the case where the specified dial number is "*#2", the remote control mode is set to "OFF".

Next, when the dial of the analog telephone 2 is operated in the state that the television phone adapter 1 is in the IP telephone mode as a result of the above step S2021 (S103), the tone detection unit 43 detects DT through the analog telephone IF unit 41 and sends the DT signal to the main control unit 60. Receiving the DT signal, the main control unit 60 specifies the dial number indicated by the DT, and uses the specified dial number as a key for searching the control content translation TL 30 for a record 300 (S203).

When a record 300 can not be retrieved in S203, a predetermined error processing is performed (S2031). On the other hand, when a record 300 can be retrieved, the specified dial number is a code for controlling the television phone adapter 1. In that case, the main control unit 60 examines the operation mode registered in the field 302 of the retrieved record 300 to judge whether that mode coincides with the current operation mode of the television phone adapter 1. Here, the operation mode of the television phone adapter 1 is the IP telephone mode. Thus, in the case where the operation mode registered in the field 302 of the retrieved record 300 is other than the IP telephone mode, a predetermined error processing is performed. Only in the case where the operation mode registered in the field 302 of the retrieved record 300 is the IP telephone mode, the main control unit 60 controls the video adapter unit 70 and the router with the IP telephone function 20 according to the setting/control item registered in the field 303 of the retrieved record 300.

For example, in the case where the specified dial number is "*7", the telephone number (held in the dial number holding unit 61) of the IP telephone destination is notified to the SIP processing 77 of the video adapter unit 77 to request the SIP processing unit 77 to establish a video communication connection. Receiving the request, the SIP processing unit 77 uses the notified telephone number to specify a URI assigned to a video adapter unit 70 (an IP processing unit 79) of a television phone adapter 1 that accommodates the destination analog telephone 2. Then, using the specified URI, the SIP processing unit 77 establishes a video communication connection with the destination through a SIP server 8 on the IP network 5. When the video communication connection is established, the main control unit 60 changes the operation mode of the television phone adapter 1 into the television phone mode (S2032).

Further, when the operation mode of the television phone adapter 1 is changed to the television phone mode in S2021 or S2032, and the video communication connection automatic displaying is "ON", the main control unit 60 displays the establishment of the video communication connection on the display unit (not shown) of the television phone adapter 1. Seeing the display, a user can confirm that a video of the communication partner can be displayed now.

Next, when the dial of the analog telephone 2 is operated in the state that the operation mode of the television phone adapter 1 is the television phone mode as a result of the above step S2021 or S2032 (S104), then the tone detection unit 43 detects DT through the analog telephone IF unit 41, and sends the DT signal to the main control unit 60. Receiving the DT signal, the main control unit 60 specifies the dial number indicated by the DT, and uses the specified dial number as a key for searching the control content translation TL 30 for a record 300 (S204).

When a record 300 can not be retrieved in S204, a predetermined error processing is performed (S2041). On the other hand, when a record 300 can be retrieved, the specified dial number is a code for controlling the television phone adapter 1. In that case, the main control unit 60 examines the operation mode registered in the field 302 of the retrieved record 300 to judge whether that operation mode coincides with the current operation mode of the television phone adapter 1.

Here, the operation mode of the television phone adapter 1 is the television phone mode. Thus, in the case where the operation mode registered in the field 302 of the retrieved record 300 is other than the television phone mode, a predetermined error processing is performed. Only in the case where the operation mode registered in the field 302 of the retrieved record 300 is the television phone mode, the main control unit 60 controls the video adapter unit 70 and the router with the IP telephone function 20 according to the setting/control item registered in the field 303 of the retrieved record 300 (S2042).

For example, in the case where the specified dial number is "*0", the main control unit 60 requests the video processing unit 73 to start video processing. Receiving the request, the video processing unit 73 inputs a video signal inputted to the video input unit 72 to the video encoder 74. The video signal inputted to the video encoder 74 is encoded there, and then the RTP processing unit 76 prepares RTP packets from the encoded signal, and further the IP processing unit 79 puts the RTP packets into IP packets. Then, through the video communication connection established by the SIP processing unit 77, the IP packets are sent from the router with the IP telephone function 20 to the television phone adapter 1 of the communication partner. Further, IP packets received from the television phone adapter 1 of the communication partner through the router with the IP telephone function 20 is processed by the IP processing unit 79 to extract RTP packets. Then the RTP processing unit 76 extracts a video signal from the RTP packets. The video signal is decoded by the video decoder 75, and thereafter outputted from the video processing unit 73 to the display 4 through the video output unit 71.

Further, in the case where the specified dial number is "*9", the main control unit 60 requests the video processing unit 73 to stop video processing. Receiving the request, the video processing unit 73 stops input of a video signal inputted to the video input unit 72 to the video encoder 74. Further, the video processing unit 73 stops output of a video signal outputted from the video decoder 75 to the video output unit 71.

Further, in the case where the specified dial number is "*6" for example, the main control unit 60 requests the video processing unit 73 to send a hold screen. Receiving the request, the video processing unit 73 inputs a video signal of the hold screen (for example, a video of "Please wait") to the video encoder 74, instead of a video signal inputted to the video input unit 72. Thus, the hold screen is displayed on the display 4 of the communication partner, without displaying a video that is not wanted to be shown to protect privacy, for example.

Further, in the case where the specified dial number is "*#0" for example, the main control unit 60 instructs the IP processing unit 79 to send Video Sending/Displaying "ON" (control information) to the destination of the IP telephone. Receiving the instruction, the IP processing unit 79 sends IP packets containing Video Sending/Displaying "ON" to the television phone adapter 1 with which the video communication connection is established, through the router with the IP telephone function 20.

Further, in the case where the specified dial number is "*#9" for example, the main control unit 60 instructs the IP processing unit 79 to send Video Sending/Displaying "OFF" (control information) to the destination of the IP telephone. Receiving the instruction, the IP processing unit 79 sends IP packets containing Video Sending/Displaying "OFF" to the television phone adapter 1 with which the video communication connection is established, through the router with the IP telephone function 20.

In the case where the IP processing unit 79 receives IP packets containing Video Sending/Displaying "ON" from the television phone adapter 1 of the communication partner with which the video communication connection is established, the IP processing unit 79 extracts Video Sending/Displaying "ON" from the IP packets and sends the extracted control information to the main control unit 60. Receiving this control information, the main control unit 60 examines whether its own apparatus is set to the remote control mode. When the remote control mode is set, the main control unit performs processing similar to the above case where the specified dial number is "*0", to send a video taken by the camera 3 to the communication partner, while displaying a video received from the communication partner on the display 4. Further, in the case where the IP processing unit 79 receives IP packets containing Video Sending/Displaying "OFF" from the television phone adapter 1 of the communication partner, the IP processing unit 79 extracts Video Sending/Displaying "OFF" from the IP packets, and sends the extracted control information to the main control unit 60. Receiving this control information, the main control unit 60 examines whether its own apparatus is set in the remote control mode. When the remote control mode is set, the main control unit 60 performs processing similar to the above case where the specified dial number is "*9", to stop sending of a video taken by the camera 3 and to stop displaying a video received from the communication partner on the display 4.

Further, in the case where the specified dial number is "*3", the main control unit 60 requests the video processing unit 73 to start or stop displaying a video taken by the camera, irrespective of the current mode of the television phone adapter 1. Receiving the request, the video processing unit 73 outputs a video signal inputted to the video input unit 72 instead of the video decoder 75 to the video output unit 71. As a result, it is possible to confirm the self-video.

When the analog telephone 2 is made on-hook (S105), the hook state detection unit 42 detects this through the analog telephone IF unit 41, and sends a hook state signal indicating the on-hook state to the main control unit 60 (S205). In the case where the current operation mode of the television phone adapter 1 is the television phone mode, the main control unit 60 requests the SIP processing unit 77 to disconnect the video communication connection. Receiving the request, the SIP processing unit 77 disconnects the established video communication connection. Further, the router with the IP telephone function 20 disconnects the established voice communication connection (S2051).

Figure 7:
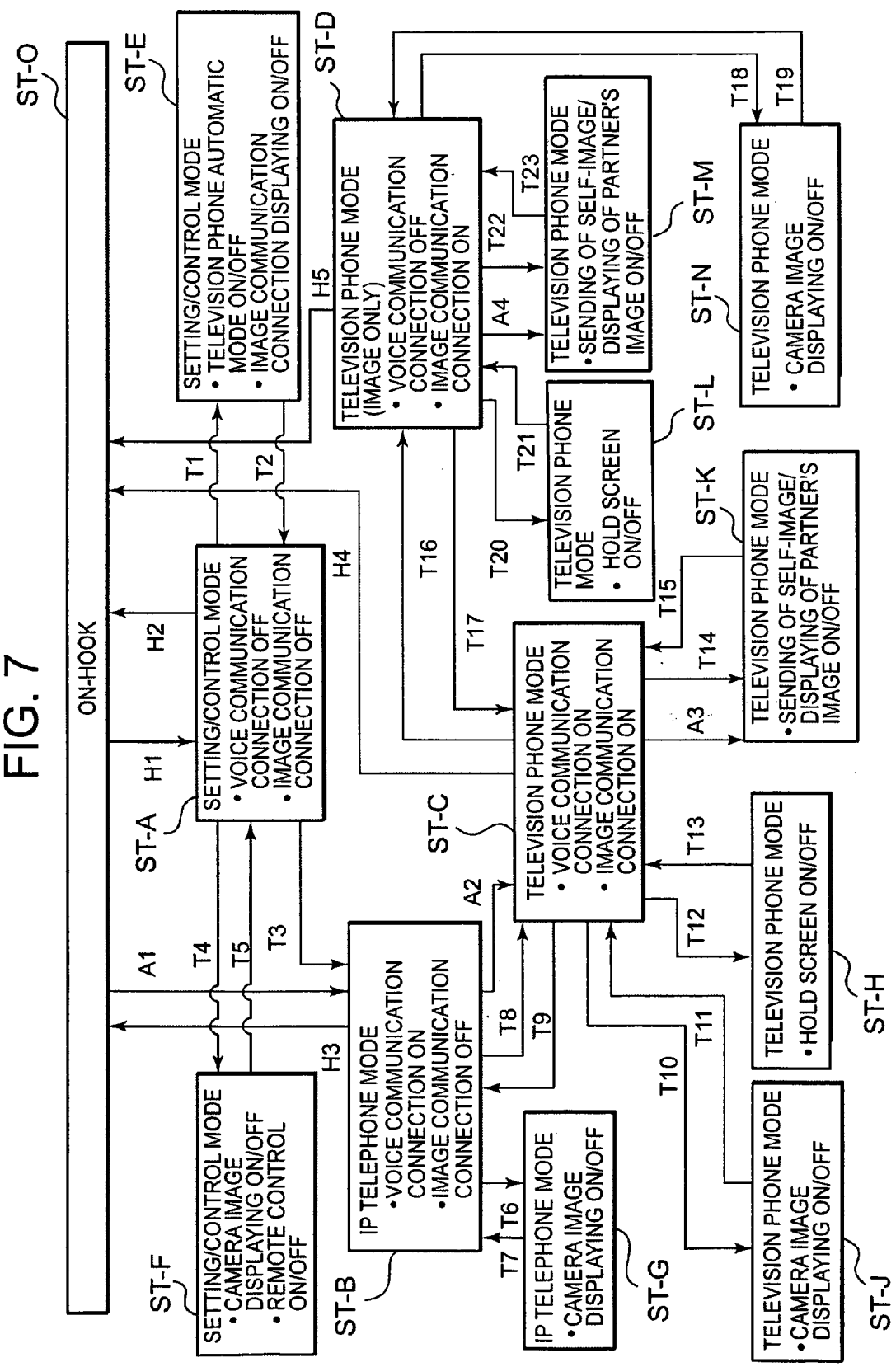
FIG. 7 is a diagram for explaining state transition of the television phone adapter 1.

FIG. 7 is a diagram for explaining state transition of the television phone adapter 1. Further, FIGS. 8 and 9 are diagrams for explaining occurrence conditions of the state transition shown in FIG. 7. In FIGS. 8 and 9, the reference numeral 802 refers to state transition, the reference numeral 803 to a state before the state transition, the reference numeral 804 to a state after the state transition, the reference numeral 805 to a content of operation for making the state transition occur, the reference numeral 806 to an operation mode (either the setting/control mode or the IP telephone mode or the television phone mode) after the state transition, and the reference numeral 807 to a content of an operation of the television phone adapter 1 after the state transition.

In the state ST-O (on-hook state), when the analog telephone 2 connected to the television phone adapter 1 is made on-hook, there occurs the state transition H1 and the television phone adapter 1 enters the setting/control mode and the main control unit 60 enters a state of awaiting dial operation of the analog telephone 2 (ST-A).

Further, in the state ST-O, when the analog telephone 2 connected to the television phone adapter 1 is made off-hook to respond to an incoming call, there occurs the state transition A1 and the television phone adapter 1 enters the IP telephone mode and the router with the IP telephone function 20 establishes a voice communication connection with a communication partner (ST-B).

In the state ST-A, when the analog telephone 2 connected to the television phone adapter 1 is made on-hook, there occurs the state transition H2 and the main control unit 60 enters a state of awaiting an incoming call (ST-O).

Further, in the state ST-A, when the dial of the analog telephone 2 connected to the television phone adapter 1 is operated to input one of dial numbers "*1", "*2", "*4" and "*5", then there occurs the state transition Ti and the main control unit 60 sets the television phone automatic mode (automatic establishing a video communication connection at establishing a voice communication connection) to ON/OFF (ON: "*1", OFF: "*2"), or the video communication connection automatic displaying (automatic display of an establishment result at establishing a video communication connection) to ON/OFF (ON: "*4", OFF: "*5") (ST-E). Thereafter, the state transition T2 occurs to return to the state ST-A.

Further, in the state ST-A, when the dial of the analog telephone 2 connected to the television phone adapter 1 is operated to input one of dial numbers "*3", "*#1" and "*#2", then there occurs the state transition T4 and the main control unit 60 performs ON/OFF switching ("*3") of camera video displaying (output of a video (self-video) taken by the camera 3 to the display 4), or sets the remote control mode (output of a video of the communication partner to the display 4 according to an instruction from the apparatus of the communication partner) to ON/OFF (ON: "*#1", OFF: "*#2") (ST-F). Thereafter, the state transition T5 occurs to return to the state ST-A.

Further, in the state ST-A, when the dial of the analog telephone 2 connected to the television phone adapter 1 is operated to input the telephone number of the communication partner, there occurs the state transition T3 and the television phone adapter 1 enters the IP telephone mode and the router with the IP telephone function 2 establishes a voice communication connection with the communication partner (ST-B).

In the state ST-B, when the analog telephone 2 connected to the television phone adapter 1 is made on-hook, there occurs the state transition H3 and the router with the IP telephone function 20 disconnects the voice communication connection with the communication partner. Then, the main control unit 60 enters a state of awaiting an incoming call (ST-O).

Further, in the state ST-B, when the dial of the analog telephone 2 connected to the television phone adapter 1 is operated to input a dial number "*3", then there occurs the state transition T6 and a video (self-video) taken by the camera 3 is outputted to the display 4 (ST-G). Thereafter, there occurs the state transition T7, to return to the state ST-B.

Further, in the state ST-B, when the dial of the analog telephone 2 connected to the television phone adapter 1 is operated to input a dial number "*7", then there occurs the state transition T8 and the television phone adapter 1 enters the television phone mode and the SIP processing unit 77 establishes a video communication connection with the communication partner (ST-C).

Further, in the state ST-B, when the television phone automatic mode is ON, there occurs the state transition A2 and the television phone adapter 1 enters the television phone mode and the SIP processing unit 77 establishes a video communication connection with the communication partner (ST-C).

In the state ST-C, when the analog telephone 2 connected to the television phone adapter 1 is made on-hook, then there occurs the state transition H4 and the router with the IP telephone function 20 disconnects the voice communication connection with the communication partner and the SIP processing unit 77 disconnects the video communication connection with the communication partner. Then, the main control unit 60 enters the state of awaiting an incoming call (ST-O).

Further, in the state ST-C, when the dial of the analog telephone 2 connected to the television phone adapter 1 is operated to input a dial number "*8", then there occurs the state transition T9 and the television phone adapter 1 enters the IP telephone mode and the SIP processing unit 77 disconnects the video communication connection with the communication partner (ST-B).

Further, in the state ST-C, when the dial of the analog telephone 2 connected to the television phone adapter 1 is operated to input a dial number "*3", then there occurs the state transition T10 to perform ON/OFF switching of display of a video (self-video) taken by the camera 3 on the display 4 (ST-J). Thereafter, the state transition T11 occurs to return to the state ST-C.

Further, in the state ST-C, when the dial of the analog telephone 2 connected to the television phone adapter 1 is operated to input a dial number "*6", then there occurs the state transition T12 to perform ON/OFF switching of display of the hold screen stored in the hold screen storage unit 78 on the display 4 of the communication partner (ST-H). Thereafter, the state transition T13 occurs to return to the state ST-C.

Further, in the state ST-C, when the dial of the analog telephone 2 connected to the television phone adapter 1 is operated to input a dial number "*0" or "*9", then there occurs the state transition T14 and sending of a video taken by the camera 3 and displaying of a video received from the communication partner are set to ON/OFF (ON: "*0", OFF: "*9") (ST-K). Thereafter, there occurs the state transition T15 to return to the state ST-C.

Further, in the state ST-C, when the remote control mode is ON and the communication partner inputs a dial number "*0" or "*9", then there occurs the state transition A3 and sending a video taken by the camera 3 and displaying of a video received from the communication partner are set to ON/OFF (ON: "*0", OFF: "*9") (ST-K). Thereafter, there occurs the state transition T15 to return to the state ST-C.

Further, in the state ST-C, when the dial of the analog telephone 2 connected to the television phone adapter 1 is operated to input a dial number "*#3", then there occurs the state transition T16 and the router with the IP telephone function 20 disconnects the voice communication connection with the communication partner, leaving the video communication connection only (ST-D).

In the state ST-D, when the analog telephone 2 connected to the television phone 1 is made on-hook, there occurs the state transition H5 and the SIP processing unit 77 disconnects the video communication connection with the communication partner. Then, the main control unit 60 enters the state of awaiting an incoming call (ST-O).

Further, in the state ST-D, when the dial of the analog telephone 2 connected to the television phone adapter 1 is operated to input the telephone number of the communication partner, then there occurs the state transition T17 and the router with the IP telephone function 20 establishes a voice communication connection with the communication partner (ST-C).

Further, in the state ST-D, when the dial of the analog telephone 2 connected to the television phone adapter 1 is operated to input a dial number "*3", then there occurs the state transition T18 to perform ON/OFF switching of display of the video (self-video) taken by the camera 3 on the display 4 (ST-N). Thereafter, the state transition T19 occurs to return to the state ST-D.

Further, in the state ST-D, when the dial of the analog telephone 2 connected to the television phone 1 is operated to input a dial number "*6", then there occurs the state transition T20 to perform ON/OFF switching of display of the hold screen stored in the hold screen storage unit 78 on the display 4 of the communication partner (ST-L). Thereafter, the state transition T21 occurs to return to the state ST-D.

Further, in the state ST-D, when the dial of the analog telephone 2 connected to the television phone adapter 1 is operated to input a dial number "*0" or "*9", then there occurs the state transition T22 and sending of a video taken by the camera 3 to the communication partner and displaying of a video received from the communication partner are set to ON/OFF (ON: "*0", FF: "*9") (ST-M). Thereafter, there occurs the state transition T23 to return to the state ST-D.

Further, in the state ST-D, when the remote control mode is ON and the communication partner inputs a dial number "*0" or "*9", then there occurs the state transition A4 and sending of a video taken by the camera 3 to the communication partner and displaying of a video received from the communication partner are set to ON/OFF (ON: "*0", OFF: "*9") (ST-M). Thereafter, there occurs the state transition T23 to return to the state ST-D.

Next, will be described a connection establishing procedure of the television phone service system shown in FIG. 1.

As a call control protocol of the IP telephone, the present embodiment uses SIP prescribed in RFC (Request for Comments) 3261 issued by IETF (Internet Engineering Task Force). However, another call control protocol such as H.323 than SIP may be used. In such a case also, a flow of an establishing procedure is similar to SIP.

Further, for telephone numbers of the IP telephone, the present embodiment uses the same number system as the telephone number system of the PSTN 6. As provisions for applying a telephone number according to the number system of the PSTN to a URI for SIP, may be mentioned ENUM (Telephone Number Mapping) prescribed in E.164 advised by ITU-T (International Telecommunication Union Standardization Section). ENUM provides translation rules for URI processing in which a telephone number is translated into an IP address. Now, representation techniques and the like for arranging telephone numbers in the reverse order are being studied, and use of ENUM can expand an area and scale of an IP network (ENUM Study Group Report May 23, 2003). ENUM prescribes application of SIP to IP telephone (voice communication connection), application of Telephone of H.323, and application to address translation in Fax, E-mail and Web. However, ENUM does not prescribe application to a video communication connection that is established separately from a voice communication connection. The present embodiment extends ENUM so that a video communication connection is assigned with the same telephone number as a voice communication connection.

FIG. 10 is a diagram for explaining a procedure of establishing a voice communication connection for the television phone service system shown in FIG. 1. Here, an analog telephone 2 and a television phone adapter 1 on the originating side, and the voice communication connection SIP server 8 nearest to that television phone adapter 1 are referred to as an analog telephone A, a television phone adapter A and a SIP server A, respectively. And, an analog telephone 2 and a television phone adapter 1 on the terminating side, and the voice communication connection SIP server 8 nearest to that television phone adapter 1 are referred to as an analog telephone B, a television phone adapter B and a SIP server B, respectively.

When the analog telephone A is made on-hook and the telephone number of the communication partner is dialed (7-1), the television phone adapter A translates the telephone number into a URI and sends INVITE to the nearest SIP server A (8-1a).

Receiving the INVITE from the television phone adapter A, the SIP server A returns 100Trying, which indicates reception of the message, to the television phone adapter A (8-2a), and, at the same time, sends this INVITE to the SIP server B (8-3).

Receiving the INVITE from the SIP server A, the SIP server B returns 100Trying, which indicates reception of the message, to the SIP server A (8-4). At the same time, based on the URI designated in the INVITE, the SIP server B specifies the IP address of the television phone adapter B as the communication partner, and sends the INVITE to the television phone adapter B (8-5).

Receiving the INVITE from the SIP server B, the television phone adapter B sends ALERT to the analog telephone B (6-1), and, at the same time, returns 180Ringing (which indicates that ALERT is on) added with its own IP address to the SIP server B (8-6a). This 180Ringing arrives at the television phone adapter A through the SIP server B and the SIP server A (8-4b, 8-2b). As a result, the television phone adapter A acquires the IP address of the television phone adapter B of the communication partner. Further, the television phone adapter A sends RBT to the analog telephone A (7-2a).

Now, when the analog telephone B is made off-hook (6-2), the television phone adapter B sends 200OK, which indicates a response, to the SIB server B (8-6b). This 200OK arrives at the television phone adapter A through the SIB server B and the SIP server A (8-4c, 8-2c). Receiving the 200OK, the television phone adapter A stops sending of RBT (7-2b).

Further, the television phone adapter A sends ACK, which indicates a confirmation response, to the television phone adapter B of the communication partner (1-5a). As a result, a voice communication connection is established between the television phone adapter A connected with the analog telephone A and the television phone adapter B connected with the analog telephone B through the SIP servers, to exchange voice data directly between the persons concerned.

In the case where an analog telephone 2 of a communication partner is connected to the PSTN 6, the television phone adapter 1 establishes a voice communication connection with the communication partner through the gateway 7. Here, the gateway 7 is an apparatus that performs call connection conversion and voice signal conversion between the IP network 5 and the PSTN 6. The television phone adapter 1 sends voice data to the gateway 7 near to the communication partner through the IP network 5. And, the gateway 7 sends the voice data to the analog telephone 2 of the communication partner through the PSTN 6. Only a charge of the IP telephone service pays the communication between the television phone adapter 1 and the gateway 7.

FIG. 11 is a diagram for explaining a procedure of establishing a video communication connection for the television phone service system shown in FIG. 1. Here, an analog telephone 2 and a television phone adapter 1 on the originating side, and the video communication connection SIP server 8 nearest to that television phone adapter 1 are referred to as an analog telephone A, a television phone adapter A and a SIP server A', respectively. And, an analog telephone and a television phone adapter 1 on the terminating side, and the video communication connection SIP server 8 nearest to that television phone adapter 1 are referred to as an analog telephone B, a television phone adapter B and a SIP server B', respectively. Further, it is assumed that a voice communication has been established between the analog telephone A and the analog telephone B according to the procedure shown in FIG. 10.

When a dial number "*7", which is assigned to a setting/control item "establishment of a video communication connection", is dialed on the analog telephone A (5-1), or when the television phone automatic mode of the television phone adapter A is "ON", then the television phone adapter A translates the telephone number of the communication partner to a URI and sends INVITE to the nearest SIP server A' (9-1*a*).

Receiving the INVITE from the television phone adapter A, the SIP server A' returns 100Trying, which indicates reception of the message, to the television phone adapter A (9-2*a*), and, at the same time, sends the INVITE to the SIP server B' (9-3).

Receiving the INVITE from the SIP server A', the SIP server B' returns 100Trying, which indicates reception of the message, to the SIP server A' (9-4). At the same time, based on the URI designated in the INVITE, the SIP server B' specifies the IP address of the television phone adapter B of the communication partner, and sends the INVITE to the television phone adapter B (9-5).

Receiving the INVITE from the SIP server B', the television phone adapter B returns 180Ringing, which indicates sending of ALERT, added with its own IP address to the SIP server B' (9-6*a*). This 180Ringing arrives at the television phone adapter A through the SIP server B' and the SIP server A' (9-4*b*, 9-2*b*). As a result, the television phone adapter A acquires the IP address of the television phone adapter B of the communication partner.

Further, the television phone adapter B sends 200OK, which indicates a response, to the SIP server B' (9-6*b*). This 200OK arrives at the television phone adapter A through the SIP server B' and the SIP server A' (9-4*c*, 9-2*c*). Receiving the 200OK, the television phone adapter A sends ACK, which indicates a confirmation response, to the television phone adapter B of the communication partner (2-5*a*). As a result, a video communication connection (which is different from the voice communication connection) is established between the television phone adapter A connected with the analog telephone A and the television phone adapter B connected with the analog telephone B through the SIP servers, to exchange video data directly between the persons concerned.

Hereinabove, the first embodiment of the present invention has been described. According to the present embodiment, a dial operation on an analog telephone 2 can control a television phone adapter 1. Further, the television phone adapter 1 is externally equipped with a camera 3 and a display 4. As a result, the television phone adapter 1 can be placed at a position at a distance (for example, visible but out of reach) from the analog telephone 2, the camera 3 and the display 4. Further, combinations of dial symbols are assigned to pieces of control information for the television phone adapter 1, it is possible to use a telephone that does not have function keys as ones of a key telephone. Thus, according to the present embodiment, an analog telephone 2 can switch between the television phone and the IP telephone. Further, according to the present embodiment, it is possible to perform processing of establishing a voice communication connection in parallel with processing of establishing a video communication connection. Thus, it is possible to shorten a time elapsing before start of the television phone.

Further, according to the television phone adapter 1 of the present embodiment, a voice communication connection is independent of a video communication connection, and separated voice and video operations are possible. Basically, video communication is performed in the state that a voice communication has been established. However, a voice communication connection can be established while different video communication is maintained (the state transition T17 in FIGS. 7 and 9).

Further, according to the present embodiment, establishment of a voice communication connection and establishment of a video connection are performed through SIP servers 8 on the IP network 5. Accordingly, an administrator of a SIP server 8 (a provider of the television phone service) can monitor states of establishment of a voice communication connection and establishment of a video communication connection to manage and limit connections, so that congestion (which is the main cause of deterioration in the IP network) can be reduced.

In the television phone adapter 1 of the present embodiment, the router with the IP telephone function 20 and the SIP processing unit 77 use the respective URI translation TLs 31 and 771 to translate a telephone number of a communication partner into a URI for voice communication and a URI for video communication. However, the present invention is not limited to this. As shown in FIG. 1, a DNS (Domain Name Server) 9 may be provided on the IP network 5, for inquiring of the DNS 9 about a URI for voice communication and a URI for video communication. In that case, the URI translation TLs 31 and 771 are not required.

FIG. 12 is a diagram for explaining a procedure for the SIP processing unit 77 of the television phone adapter 1 to acquire the communication partner's URI used for video communication from the DNS 9. In the video communication connection establishing procedure shown in FIG. 11, this procedure is performed before the television phone adapter A on the originating side sends INVITE to the SIP server A' (9-1*a*).

When a dial number "*7", which is assigned to the setting/control item "establishment of a video communication connection", is dialed on the analog telephone A (5-1), or when the television phone automatic mode of the television phone adapter A is "ON", then the SIP processing unit 77 of the television phone adapter A translates the telephone number of the communication partner into a domain name according to predetermined rules, and sends an inquiry about a URI corresponding to the domain name to the DNS 9 through the IP processing unit 79 and the router with the IP telephone function 20 (4-1). Here, the translation from the telephone number into the domain name can be performed according to rules similar to ones prescribed in ENUM. For example, a telephone number is converted into an E.164 number notation, and this notation is further converted into an AUS (Application Unique String). Thereafter, "+" in the head is deleted to leave only numbers, and then the numbers are rearranged in the reverse order, inserting "." between numbers in the character string of these numbers. This character string is added, at its end, with a character string indicating a video communication channel, to generate a domain name. For example, in the case where the telephone number is "03-1234-5678" and the character string indicating a video communication channel is ".e164.ipvd", then the obtained domain name is "8.7.6.5.4.3.2.1.3.1.8.e164.ipvd".

Receiving the inquiry about the URI from the television phone adapter A, the DNS 9 refers to a table that is stored in DNS 9 itself and indicates correspondence between a domain name and a URI, to specify the URI corresponding to the domain name designated in the inquiry. Then, DNS 9 adds the specified URI to an answer to the inquiry and sends the answer to the television phone adapter A (4-2). As a result, the SIP processing unit 77 of the television phone adapter A can acquire the URI of the communication partner.

Here, has been described the procedure for the SIP processing unit 77 of the television phone adapter 1 to acquire the communication partner's URI used for video communication, from the DNS 9. A similar procedure is used for the router with the IP television function 20 of the television phone adapter to acquire the communication partner's URI used for voice communication from the DNS 9. However, in the voice communication connection establishing procedure shown in FIG. 10, the procedure for acquiring the communication partner's URI used for voice communication is executed before the television phone adapter A sends INVITE to the SIP server A (8-1*a*).

Second Embodiment

Next, will be described a television phone adapter that realizes an ordinary telephone, an IP telephone and a television phone, as a second embodiment of the present invention.

Figure 13:
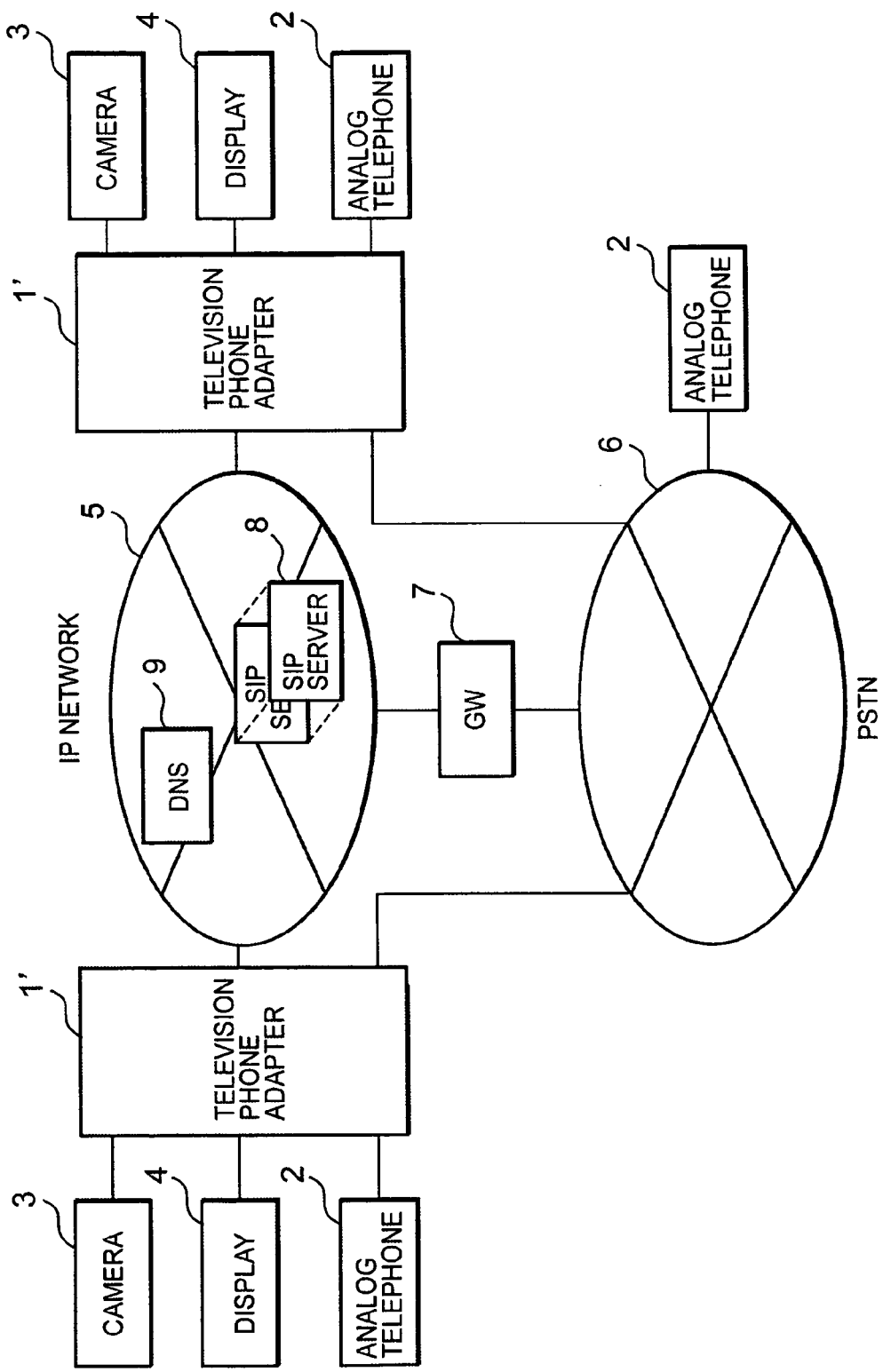
FIG. 13 is a schematic diagram showing a television phone service system using a television phone adapter according to a second embodiment of the present invention.

FIG. 13 is a schematic diagram showing a television phone service system using the television phone adapter according to the second embodiment of the present invention. Here, a component having the same function has the same reference numeral as in the first embodiment. As shown in the figure, the television phone adapter 1' of the present embodiment can perform voice communication not only through the IP network 5 but also through the PSTN 6. Accordingly, the television phone adapter 1' has an ordinary telephone mode in addition to the IP telephone mode and the television phone mode. In the case of the ordinary telephone mode, the television phone adapter 1' establishes a voice communication connection with another television phone adapter 1' that accommodates a communication partner (an analog telephone 2) for the analog telephone 2 accommodated by the television phone adapter 1' itself through the PSTN 6. Then, through this connection, voice signals are exchanged between the analog telephone 2 accommodated by the television phone adapter 1' itself and the communication partner. Further, the television phone mode of the present embodiment includes an IP-telephone-with-video-function mode and an IP-telephone-without-video-function mode.

Figure 14:
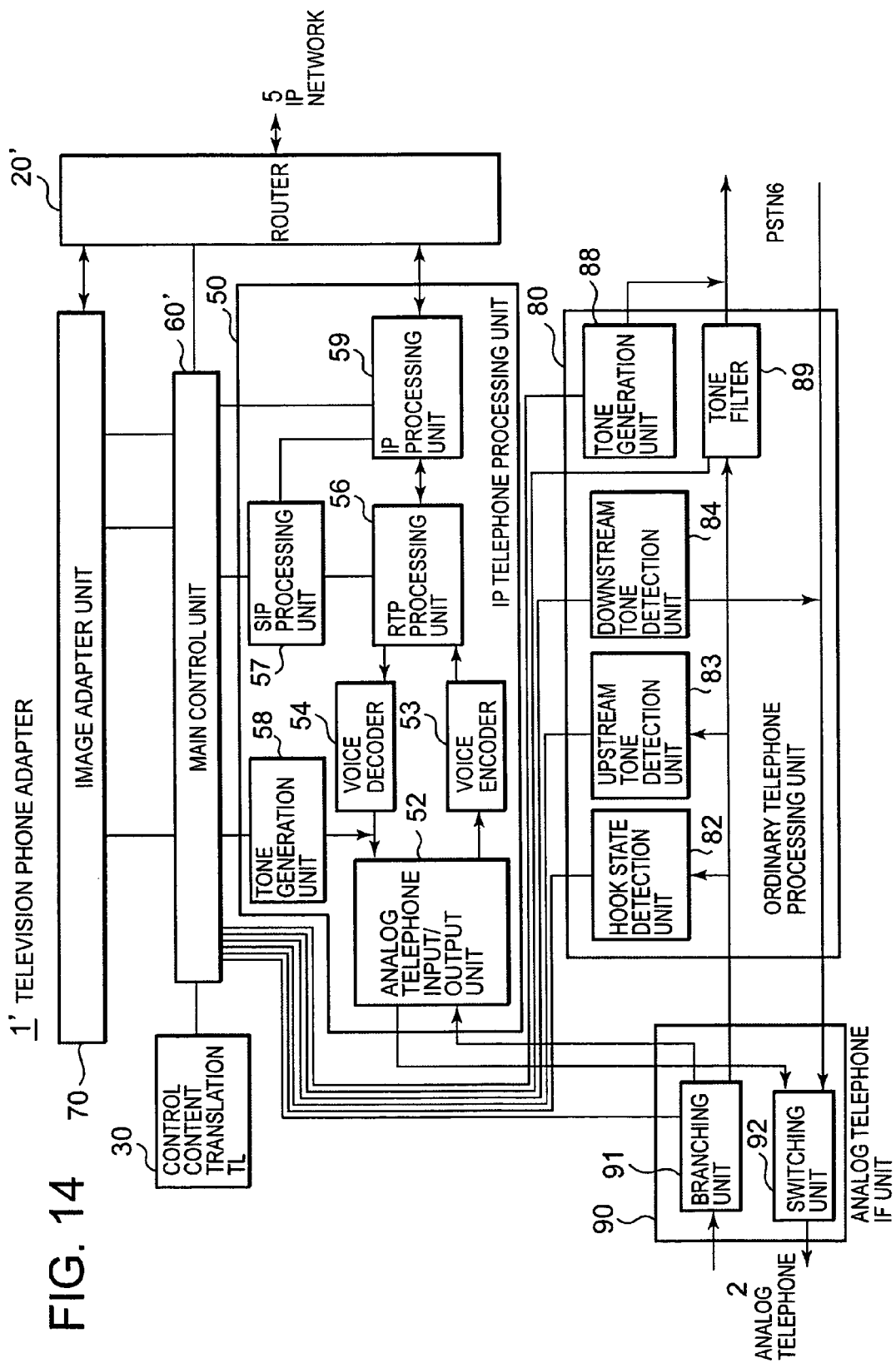
FIG. 14 is a schematic block diagram showing the television phone adapter 1' according to the second embodiment of the present invention.

FIG. 14 is a schematic block diagram showing the television phone adapter 1'. As shown in the figure, the television phone adapter 1' of the present embodiment is different from the television phone adapter 1 of the first embodiment in that a router 20' is provided instead of the router with the IP telephone function 20, a main control unit 60' instead of the main control unit 60, and an analog telephone IF unit 90, an ordinary telephone processing unit 80 and an IP telephone processing unit 50 instead of the telephone adapter unit 40. The other components are same as ones in the television phone adapter 1 of the first embodiment. However, the field 302 of the control content translation TL 30 of the present embodiment registers the ordinary telephone mode as the operation mode.

The router 20' is an ordinary router without having an IP telephone function. In the router 20' of the present embodiment also, a junction of the IP terminal port and the IP network 5 is not terminated but a bridge connection, similarly to the router with the IP telephone function 20 used in the first embodiment. This prevents a problem that a global IP address is terminated at the router 20' and thus the video adapter unit 70 and the IP telephone processing unit 50 can not perform the SIP processing. Here, the router 20' may be an external device.

The analog telephone IF unit 90 has a branching unit 91 and a switching unit 92.

The branching unit 91 branches a signal from the analog telephone 2 into two signals and sends these two signals to the ordinary telephone processing unit 80 and the IP telephone processing unit 50 respectively.

The switching unit 92 selects one of the ordinary telephone processing unit 80 and the IP telephone processing unit 50 according to an instruction of the main control unit 60', and sends a signal from the selected unit to the analog telephone 2. In the present embodiment, the IP telephone processing unit 50 is selected in a default state, and the ordinary telephone processing unit 80 is selected according to a switching instruction from the main control unit 60'.

The ordinary telephone processing unit 80 connects the analog telephone 2, which is connected to the analog telephone IF unit 90, to the PSTN 6. As shown in the figure, the ordinary telephone processing unit 80 comprises a hook state detection unit 82, an upstream tone detection unit 83, a down stream tone detection unit 84, a tone generation unit 88 and a tone filter 89.

The hook state detection unit 82 detects an off-hook/on-hook state of the analog telephone 2 connected to the analog telephone IF unit 90 and sends a hook state signal indicating the detection result to the main control unit 60'.

The upstream tone detection unit 83 detects various tones (DT:dial tone, RBT:ring back tone, and BT:busy tone) sent from the analog telephone 2 connected to the analog telephone IF unit 90, and sends these tones to the main control unit 60'.

The downstream tone detection unit 84 detects various tones (DT, RBT and BT) sent from the PSTN 6 to the analog telephone 2 connected to the analog telephone IF unit 90 and sends these tones to the main control unit 60'.

According to an instruction from the main control unit 60', the tone filter 89 switches ON/OFF of filtering of various tones (including off-hook) included in a signal sent from the analog telephone 2 connected to the analog telephone IF unit 90 to the PSTN 6. In the present embodiment, filtering is "ON" in the default state.

The tone generation unit 88 generates various tones (including off-hook) according to an instruction from the main control unit 60', and superimposes a generated tone on a signal outputted from the tone filter 89.

The IP telephone processing unit 50 comprises an analog telephone input/output unit 52, a voice encoder 53, a voice decoder 54, an RTP processing unit 56, a SIP processing unit 57, a tone generation unit 58 and an IP processing unit 59.

The analog telephone input/output unit 52 performs A/D conversion of a voice signal of the analog telephone 2, which is outputted from the analog telephone IF unit 90, and outputs the converted signal to the voice encoder 53. Further, the analog telephone input/output unit 52 performs D/A conversion of a voice signal outputted from the voice decoder 54 and outputs the converted signal to the analog telephone IF unit 90.

The voice encoder 53 encodes a voice signal outputted from the analog telephone input/output unit 52 and outputs the encoded signal to the RTP processing unit 56. The voice decoder 54 decodes a voice signal outputted from the RTP processing unit 56 and outputs the decoded signal to the analog telephone input/output unit 53.

The RTP processing unit 56 prepares RTP packets from a voice signal encoded by the voice encoder 53, and outputs the packets to the IP processing unit 59. Further, the RTP processing unit 56 extracts a voice signal from RTP packets outputted from the IP processing unit 59 and outputs the extracted signal to the voice decoder 53.

The SIP processing unit 57 controls a connection (a voice communication connection) used for the RTP processing unit 56 to exchange RTP packets with the destination apparatus. In detail, the SIP processing unit 57 exchanges SIP packets containing call control information with the destination apparatus through the IP processing unit 59, to control a voice communication connection.

The IP processing unit 59 puts RTP packets received from the RTP processing unit 56 and SIP packets received from the SIP processing unit 57 into IP packets, and outputs the IP packets to the router 20'. Further, the IP processing unit 59 extracts RTP packets and SIP packets from IP packets received from the router 20' and outputs the RTP packets and SIP packets to the RTP processing unit 56 and the SIP processing unit 57 respectively.

And, the tone generation unit 58 generates various tones (including off-hook) according to an instruction from the main control unit 60', and superimposes a generated tone on a signal outputted from the voice decoder 54.

The main control unit 60' performs the following processing in addition to the processing performed by the main control unit 60 of the first embodiment. Namely, in the case where a dial number detected by the upstream tone detection unit 83 is a telephone number of the IP telephone, the main control unit 60' notifies the SIP processing unit 57 of this telephone number to request establishment of a voice communication connection. Further, in the case where a dial number detected by the upstream detection unit 83 is not a telephone number of the IP telephone, the main control unit 60' controls the analog telephone IF unit 90 to select the ordinary telephone processing unit 80. Here, whether a dial number detected by the upstream tone detection unit 83 is a telephone number of the IP telephone or not can be judged by examining whether the telephone number contains a predetermined specific number (for example, 050). Further, the min control unit 60' instructs the tone generation units 58 and 88 to generate various tones.

Figure 15:
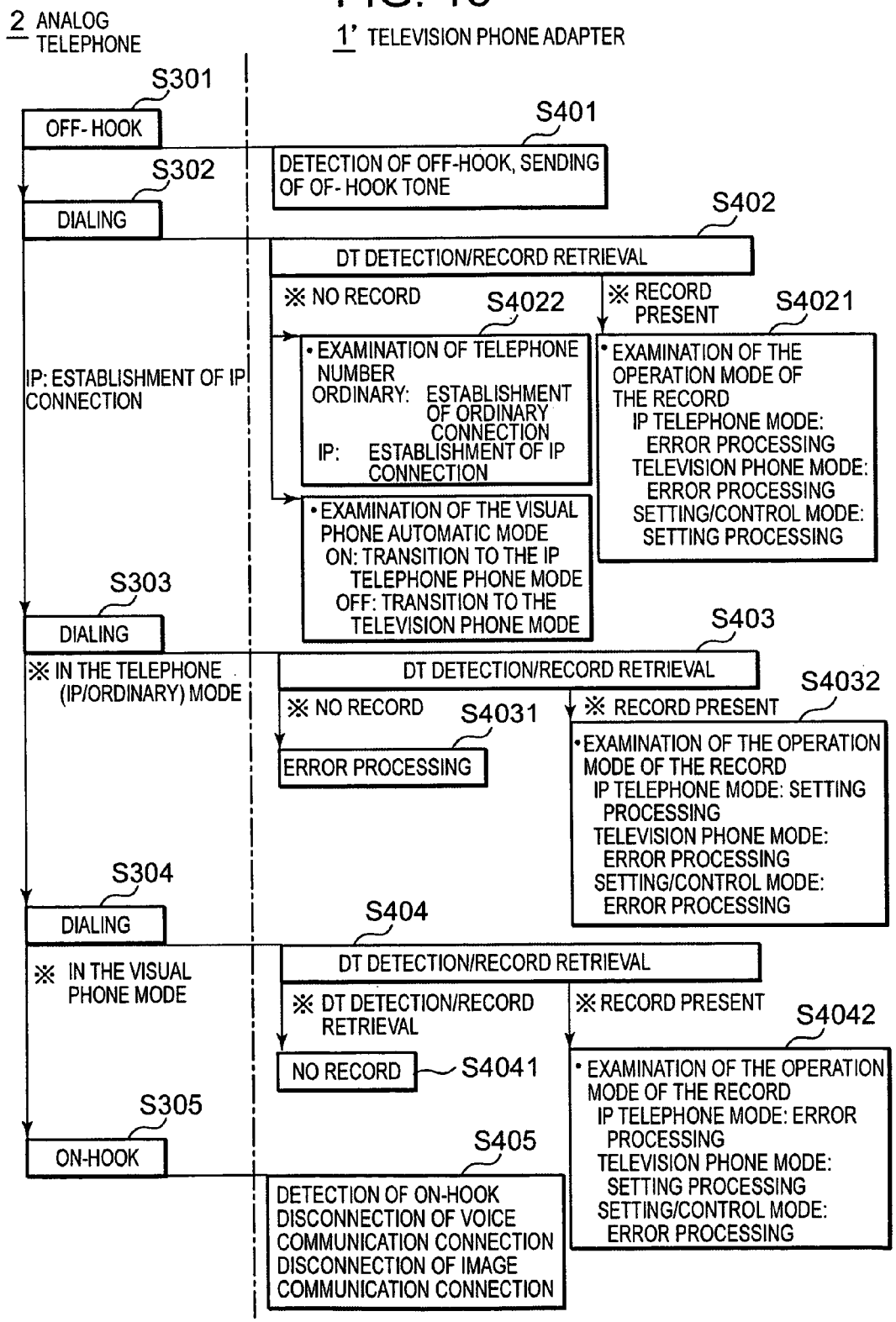
FIG. 15 is a diagram for explaining an operating procedure of the television phone adapter 1'.

Next, will be described operation of the television phone adapter 1'. FIG. 15 is a diagram for explaining an operating procedure of the television phone adapter 1'.

First, when the analog telephone 2 is made off-hook (S301), the hook state detection unit 82 detects this through the analog telephone IF unit 90, and sends a hook state signal indicating the off-hook state to the main control unit 60'. Receiving the hook state signal, the main control unit 60' instructs the tone generation unit 58 to generate a tone signal indicating the off-hook state. This tone signal is subjected to D/A conversion in the analog telephone input/output unit 52 and thereafter sent to the analog telephone 2 through the analog telephone IF unit 90 (S401).

Next, when the dial of the analog telephone 2 is operated (S302), the tone detection unit 83 detects DT through the analog telephone IF unit 90, and sends the DT signal to the main control unit 60'. Receiving the DT signal, the main control unit 60' specifies the dial number indicated by DT, and uses the specified dial number as a key for searching the control content translation TL 30 for a record 300 (S402).

When a record 300 can be retrieved in S402, the processing similar to S2022 of FIG. 6 is performed (S4021). On the other hand, when a record 300 can not be retrieved in S402, the specified dial number is a telephone number of the destination of the IP telephone or the ordinary telephone. Thus, the main control unit 60' examines whether the specified telephone number is an IP telephone number of an ordinary telephone number (S4022).

When the specified dial number is found to be an IP telephone number in S4022, the main control unit 60' notifies the IP telephone number of the destination to the SIP processing unit 57 of the IP telephone processing unit 50, to request the SIP processing unit 57 to establish a voice communication connection. Receiving the request, the SIP processing unit 57 specifies the voice communication URI assigned to a television phone adapter 1 that accommodates the analog telephone 2 of the destination, and uses the specified URI t establish a voice communication connection with the communication partner through SIP servers 8. When the voice communication connection has been established, the main control unit 60' changes the operation mode of the television phone adapter 1' to the IP telephone mode. As a result, a voice signal inputted into the analog telephone input/output unit 50 is encoded by the voice encoder 53 and thereafter packetized into RTP packets by the RTP processing unit 56, and further packetized into IP packets by the IP processing unit 59. The router 20' sends these IP packets to the television phone adapter 1' of the communication partner through the voice communication connection established by the SIP processing unit 57. Further, the IP processing unit 59 extracts RTP packets from IP packets of the television phone adapter 1' of the communication partner, which are received from the router 20' through the voice communication connection, and the RTP processing unit 56 extracts a voice signal from the RTP packets. Then, the voice decoder 54 decodes the voice signal and thereafter, the decoded voice signal is outputted to the analog IF unit 90 through the analog telephone input/output unit 52.

Further, in the case where the specified dial number is found to be an ordinary telephone number in S4022, the switching unit 92 controls the analog telephone IF unit 90 to select the ordinary telephone processing unit 50. Further, the filtering of the tone filter 89 is changed to "OFF", and the tone generation unit 88 is controlled to generate a DT indicating the specified telephone number. As a result, call control processing is performed with respect to the PSTN 6, and a voice communication connection with the communication partner is established. When the voice communication connection is established, the main control unit 60' changes the operation mode of the television phone adapter 1' to the ordinary telephone mode. Here, based on tones detected by the tone detection units 83 and 84, it is possible to judge whether the voice communication connection through the PSTN 6 has been established.

Further, in parallel with the processing of S4022, the main control unit 60' notifies the telephone number of the communication partner to the SIP processing unit 77 of the video adapter unit 70 when the television phone automatic mode set in the main control unit 60' itself is "ON", to request the SIP processing unit 77 to establish a video communication connection. Receiving the request, the SIP processing unit 77 specifies the communication partner's URI for video communication, based on the notified telephone number, and uses the specified URI to establish a video communication connection with the communication partner through SIP servers 8. When both the voice communication connection and video communication connection are established, the main control unit 60' changes the operation mode of the television phone adapter 1 to the television phone mode (S4023).

Next, when the operation mode of the television phone adapter 1' is found to be the telephone (IP telephone or ordinary telephone) mode in the above S4022 and the dial of the analog telephone 2 is operated (S303), then the tone detection unit 83 detects DT through the analog telephone IF unit 90 and sends the DT signal to the main control unit 60'. Receiving the DT signal, the main control unit 60' specifies the dial number indicated by the DT, and use the specified dial number as a key for searching the control content translation TL 30 for a record 300 (S403).

When a record 300 can not be retrieved in S403, a predetermined error processing is performed (S4031). On the other hand, when a record 300 can be retrieved in S403, the specified dial number is a code for controlling the television phone adapter 1'. In that case, the main control unit 60' examines the operation mode registered in the field 302 of the retrieved record 300, to judge whether the operation mode coincides with the current operation mode of the television phone adapter 1'. Here, the operation of the television phone adapter 1' is the IP telephone mode or the ordinary telephone mode. Thus, when the operation mode registered in the field 302 of the retrieved record 300 is other than the IP telephone mode and the ordinary telephone mode, a predetermined error processing is performed. Only when the operation mode registered in the field 302 of the retrieved record 300 is the IP telephone mode or the ordinary telephone mode, the video adapter unit 70 and the router 20' are controlled according to the setting/control item registered in the field 303.

When the operation mode of the television phone adapter 1' is changed to the television phone mode in the above S4023 or S4032 and the video communication connection automatic displaying, which is set in the main control unit 60' itself, is "ON", then the main control unit 60' displays the establishment of a video communication connection on a display unit (not shown) provided to the television phone adapter 1'. Seeing the display, a user can confirm that a video of the communication partner can be displayed now.

Next, when the operation mode of the television phone adapter 1' is the television phone mode owing to the above S4023 or S4032, and the dial of the analog telephone 2 is operated (S304), then the tone detection unit 83 detects DT through the analog telephone IF unit 90 and sends the DT signal to the main control unit 60'. Receiving the DT signal, the main control unit 60' specifies the dial number indicated by the DT, an used the specified dial number as a key for searching the control content translation TL 30 for a record 300 (S404).

When a record 300 can not be retrieved in S404, a predetermined error processing is performed (S4041). On the other hand, when a record 300 can be retrieved in S404, the specified dial number is a code for controlling the television phone adapter 1'. In that case, processing similar to S2042 of FIG. 6 is performed (S4042).

Now, when the analog telephone 2 is made on-hook (S305), the hook state detection unit 82 detects this through the analog telephone IF unit 90 and sends a hook state signal indicating the on-hook state to the main control unit 60'. When the current mode of the television phone adapter 1' is the television phone mode, the main control unit 60' requests the SIP processing unit 77 to disconnect the video communication connection. Receiving the request, the SIP processing unit 77 disconnects the established video communication connection. Further, when the voice communication connection has been established and that connection is a voice communication connection for the IP telephone, the main control unit 60' requests the SIP processing unit 57 to disconnect the connection. Receiving the request, the SIP processing unit 57 disconnects the established voice communication connection. On the other hand, when the connection is a voice communication connection for the ordinary telephone, the on-hook operation disconnects the established voice communication connection (S405).

Hereinabove, the second embodiment of the present invention has been described. The second embodiment can use an ordinary router 20' without the IP telephone function, in addition to the advantages of the first embodiment. Further, by providing the ordinary telephone processing unit 80, it is possible to communicate with a communication partner even when the IP network 5 can not be used owing to, for example, congestion.

In the second embodiment, the hook state detection unit 82 and the tone detection unit 83 are provided in the ordinary telephone processing unit 80. However, these detection units 82 and 83 may be provided in the IP telephone processing unit 50 (between the analog telephone input/output unit 52 and the analog telephone IF unit 90, or between the analog telephone input/output unit 52 and the voice encoder 53).

Third Embodiment

Next, will be described a television phone adapter that realizes an ordinary telephone, an IP telephone and a television phone, as a third embodiment of the present invention. A schematic diagram showing a television phone service system using the television phone adapter 1" of the third embodiment of the present invention is similar to FIG. 13 showing the television phone service system of the second embodiment, and omitted here.

Figure 16:
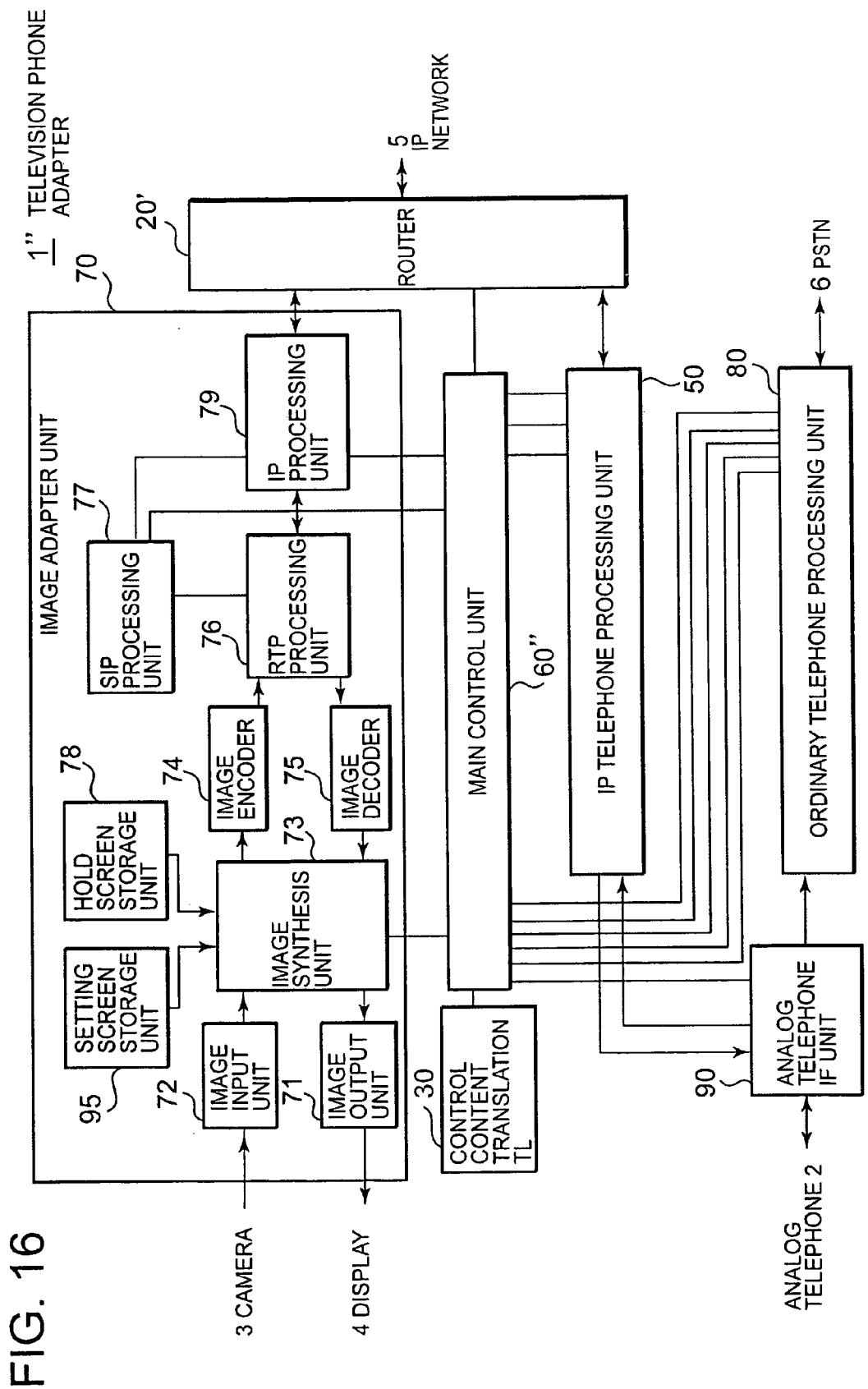
FIG. 16 is a schematic block diagram showing a television phone adapter 1" according to a third embodiment of the present invention.

FIG. 16 is a schematic block diagram showing the television phone adapter 1". As shown in the figure, the television phone adapter 1" of the present embodiment differs from the television phone adapter 1' of the second embodiment in that a setting screen storage unit 95 is added to the video adapter 70 and the main control unit 60" is provided instead of the main control unit 60', and the control content translation TL 30 is added with records 300' (See FIG. 5) for router setting and the like. The other components are same as ones in the television phone adapter 1' of the second embodiment. In addition to the processing by the main control unit 60' of the second embodiment, the main control unit 60" controls the video processing unit 73 to control display of the screen data stored in the setting screen storage unit 95 on the display 4. Here, it is assumed that the setting screen storage unit 95 stores at least router setting screen data for explaining dial operation for various settings of the router 20', port allocation setting screen data for explaining dial operation for port allocation of the router 20', security setting screen data for security setting of the router 20', and address setting screen data for setting the address of the router 20'.

The operation of the television phone adapter 1" of the present embodiment is similar to the operation of the television phone adapter 1' of the second embodiment shown in FIG. 15. For example, when the dial number detected by the tone detection unit 83 is "*#*" in S4021, the main control unit 60" controls the video processing unit 73 such that the video processing unit 73 outputs the router setting screen data stored in the setting screen storage unit 95 to the video output unit 71. As a result, the user can confirm the dial operation required for various settings of the router 20'.

Further, for example, when the dial number detected by the tone detection unit 83 is "*12" in S4021, the main control unit 60" controls the video processing unit 73 such that the video processing unit 73 outputs the port allocation setting screen data stored in the setting screen storage unit 95 to the video output unit 71. As a result, the user can confirm the dial operation required for port allocation setting of the router 20'. In that case, the main control unit 60" receives dial operation for port allocation setting through the tone detection unit 83, until a certain dial number for ending the port allocation setting is received from the tone detection unit 83. In that period, the main control unit 60" does not give an instruction to the IP telephone processing unit 50 and the ordinary telephone processing unit 80 (i.e., such an instruction is masked). As a result, various dial operations such as dialing of a telephone number originally used for establishing a connection can be assigned to port allocation setting operations. For example, a dial number "10" is not used for establishing a connection, but corresponds to the port number "10". The main control unit 60" sets the received port allocation to the router 20'.

Further, for example, when the dial number detected by the tone detection unit 83 is "*13" in S4021, then the main control unit 60" controls the video processing unit 73 such that the video processing unit 73 outputs the security setting screen data stored in the setting screen storage unit 95 to the video output unit 71. As a result, the user can confirm the dial operation required for security setting of the router 20'. Further, in that case, the main control unit 60" receives dial operation for the security setting through the tone detection unit 83, until a certain dial number for ending the security setting is received from the tone detection unit 83. In that period, the main control unit 60" does not give an instruction to the IP telephone processing unit 50 and the ordinary telephone processing unit 80 (i.e., such an instruction is masked). As a result, various dial operations such as dialing of a telephone number originally used for establishing a connection can be assigned to security setting operations. Then, the main control unit 60" sets the received security items to the router 20'.

Further, for example, when the dial number detected by the tone detection unit 83 is "*14" in S4021, then the main control unit 60" controls the video processing unit 73 such that the video processing unit 73 outputs the address setting screen data stored in the setting screen storage unit 95 to the video output unit 71. As a result, the user can confirm the dial operation for the address setting. Further, in that case, the main control unit 60" receives dial operation for the address setting through the tone detection unit 83, until a predetermined dial number for ending the address setting is received from the tone detection unit 83. In that period, the main control unit 60" does not give an instruction to the IP telephone processing unit 50 and the ordinary telephone processing unit (i.e., such an instruction is masked). As a result, various dial operations such as dialing of a telephone number used for establishing a connection can be assigned to the address setting operations. The main control unit 60" sets the received address to the router 20'.

Further, when the dial number detected by the tone detection unit 83 is "*10" in S4021, then the main control unit 60" controls the video processing unit 73 to stop output of the setting screen data stored in the setting screen storage unit 95 to the video output unit 71. In addition, the mask of instructions to the IP telephone processing unit 50 and the ordinary telephone processing unit 80 is cancelled.

Hereinabove, the third embodiment of the present invention has been described. According to the third embodiment, it is possible to use a setting screen for dialing while confirming the dial operation required for desired setting, thus reducing operation errors, in addition to the advantages of the second embodiment.

The present invention is not limited to the above-described embodiments, and can be variously varied within the scope of the invention. For example, in the above embodiments, the camera 3 is connected for inputting a video signal. However, instead of the camera 3, a VTR or DVD player may be connected to play already-recorded video/voice. Further, instead of the display 4, a TV receiver may be connected to play TV broadcast data. Further, the embodiments have been described, assuming that an analog video signal is used for taking and displaying a video. However, a digital video signal may be used.

Further, in the second and third embodiments, the tone detection unit 83 or 84 is provided in the ordinary telephone processing unit 80. However, the tone detection unit 83 or 84 may be provided in the IP telephone processing unit 50. In detail, the tone detection unit 83 may be provided between the analog telephone input/output unit 52 and the voice encoder 53. Or, the tone detection unit 84 may be provided between the voice decoder 54 and the analog telephone input/output unit 52.

Further, in the above embodiments, the analog telephone 2 is provided as an external device. However, the analog telephone 2 and the television phone adapter 1, 1' or 1" may be housed in a same case. Further, in the above embodiments, the analog telephone 2 is provided as a separate component. However, from the viewpoint of operation based on the dial detection function of the analog telephone, the analog telephone 2 and the television phone adapter 1, 1' or 1" may be integrated to realize a television phone by detecting a dial tone.

Further, the above embodiments have been described taking the example where the prescriptions of ENUM are extended to establish a video communication channel. At present, the proposed prescriptions of ENUM include tel, SIP, http and mail, based on a call connection of the IP telephone. When, for example, E2U+video:sip is added as the service field, it is possible to define SIP differentiated from SIP of the IP telephone. Based on this idea, the above embodiments use URI for a video communication channel separately from URI for a voice communication channel. Basically, separately from the URI translation rules for a voice communication channel based on a telephone number, the URI translation rules for a video communication channel based on the same telephone number are used. As a result, it is possible to receive service of a video communication channel independent of a voice communication channel, from a provider that manages connections of the television phone service.

The present invention can use the conventional analog telephone as an operation terminal for realizing the television phone through an IP network, and thus it is possible to realize two-way IP network transmission that can be used easily by so-called digitally-divided people.

According to the present invention, it is possible to provide a television phone adapter through which an IP telephone service company can grasp states of voice communication connections and video communication connections. Further, it is possible to provide a television phone adapter through which an ordinary analog telephone can switch the telephone with video function and the telephone without video function.

What is claimed is:

1. A television phone adapter which permits an analog telephone to operate as a television phone using an IP network, comprising:

an IP telephone processing unit, which automatically connects and disconnects a voice communication connection using the IP network, sends voice received from the analog telephone to a communication partner and outputs voice received from said communication partner to said analog telephone through said voice communication connection in a connected state;

a dial operation detection unit which detects dial operation of said analog telephone; and a video adapter unit which connects and disconnects a video communication connection using the IP network, sends a video received from a video input unit to a communication partner and outputs a video received from said communication partner to a video output unit through said video communication connection in a connected state; wherein:

said video adapter unit sends a video communication connection request whose destination number is a telephone number detected by said dial operation detection unit, to a certain server existing on the IP network, and wherein said video adapter unit converts the telephone number detected by said dial operation detection unit into a domain name in which a character string indicating a video communication channel is added to information obtained from the telephone number, inquires of a DNS existing on the IP network about a URI corresponding to said domain name, and sends a video communication connection request designating said URI obtained from the DNS to said certain server.

2. A television phone adapter according to claim 1, wherein the dial numbers are each a combination of at least two dial symbols.

3. A television phone adapter which permits an analog telephone to operate as a television phone using an IP network, comprising:

a dial operation detection unit which detects dial operation of the analog telephone connected to an apparatus having an IP telephone function;

a video adapter unit which connects and disconnects a video communication connection using the IP network, sends a video received from a video input unit to a communication partner and outputs a video received from said communication partner to a video output unit through said video communication connection in a connected state;

a translation table which describes correspondence between a plurality of dial numbers and a plurality of setting/control items of control content; and a main control unit which controls connection and disconnection of said video communication connection by said video adapter unit, according to a setting/control item corresponding to one of the dial numbers detected by said dial operation detection unit, when said translation table stores said setting/control item corresponding to said dial number.

4. A television phone adapter according to claim 3, wherein when a setting/control item stored in said translation table in association with said dial number detected by said dial operation detection unit is automatic connection of a video communication connection, said main control unit notifies an IP telephone number detected by said dial operation detection unit to said video adapter unit to make said video adapter unit establish a video communication connection with the communication partner who has said IP telephone number.

5. A television phone adapter according to claim 3, wherein when a setting/control item stored in said translation table in association with said dial number detected by said dial operation detection unit is displaying of a self-video, said main control unit controls said video adapter unit such that said video adapter unit outputs a video received from said video input unit to said video output unit.

6. A television phone adapter according to claim 3, wherein said television phone adapter further comprises a hold screen storage unit that stores hold screen data; and when a setting/control item stored in said translation table in association with said dial number detected by said dial operation detection unit is displaying of a hold screen, said main control unit controls said video adapter unit such that said video adapter unit sends the hold screen data stored in said hold screen storage unit to the communication partner through said video communication connection in the connected state.

7. A television phone adapter according to claim 3, further comprising:

a setting screen storage unit which stores setting screen data indicating correspondence between dial numbers and setting/control items, wherein when a setting/control item stored in said translation table in association with one of said dial numbers detected by said dial operation detection unit is displaying of a setting screen, said main control unit controls said video adapter unit such that said video adapter unit outputs the setting screen data stored in said setting screen storage unit to said video output unit.

8. A television phone adapter which permits an analog telephone to operate as a television phone using an IP network, comprising:

an IP telephone processing unit, which automatically connects and disconnects a voice communication connection using the IP network, sends voice received from the analog telephone to a communication partner and outputs voice received from said communication partner to said analog telephone through said voice communication connection in a connected state;

a dial operation detection unit which detects dial operation of said analog telephone;

a video adapter unit connects and disconnects a video communication connection using the IP network, sends a video received from a video input unit to a communication partner and outputs a video received from said communication partner to a video output unit through said video communication connection in a connected state;

a translation table that describes correspondence between a plurality of dial numbers and a plurality of setting/control items of control content; and a main control unit that controls connection and disconnection of said video communication connection by said video adapter unit, according to a setting/control item corresponding to one of the dial numbers detected by said dial operation detection unit, when said translation table stores said setting/control items corresponding to said dial numbers.

9. A television phone adapter according to claim 8, wherein when a setting/control item stored in said translation table in association with said dial number detected by said dial operation detection unit is automatic connection of a video communication connection, said main control unit notifies an IP telephone number detected by said dial operation detection unit to said video adapter unit to make said video adapter unit establish a video communication connection with the communication partner who has said IP telephone number.

10. A television phone adapter according to claim 8, wherein when a setting/control item stored in said translation table in association with said dial number detected by said dial operation detection unit is displaying of a self-video, said main control unit controls said video adapter unit such that said video adapter unit outputs a video received from said video input to said video output unit.

11. A television phone adapter according to claim 8, further comprising:
a hold screen storage unit which stores hold screen data, wherein
when a setting/control item stored in said translation table in association with said dial number detected by said dial operation detection unit is displaying of a hold screen, said main control unit controls said video adapter unit such that said video adapter unit sends the hold screen data stored in said hold screen storage unit to the communication partner through said video communication connection in the connected state.

12. A television phone adapter according to claim 8, further comprising:
a setting screen storage unit which stores setting screen data indicating correspondence between dial operation and a setting content, wherein
when a setting/control item stored in said translation table in association with said dial number detected by said dial operation detection unit is displaying of a setting screen, said main control unit controls said video adapter unit such that said video adapter unit outputs the setting screen data stored in said setting screen storage unit to said video output unit.

13. A television phone adapter according to claim 8, wherein the dial numbers are each a combination of at least two dial symbols.

14. A television phone adapter which permits an analog telephone to operate as a television phone using an IP network, comprising:
a telephone processing unit which connects a line, using dial tones;
a dial tone detection unit which detects said dial tones;
a video adapter unit which connects and disconnects a video communication connection using the IP network, sends a video received from a video input unit to a communication partner and outputs a video received from said communication partner to a video output unit through said video communication connection in a connected state;
a translation table which describes correspondence between a plurality of dial tones and a plurality of setting/control items of control content; and
a main control unit which controls connection and disconnection of said video communication connection by said video adapter unit, according to a setting/control item corresponding to one of the dial tones detected by said dial tone detection unit, when said translation table stores said setting/control items corresponding to said dial tones.

15. A television phone adapter which permits an analog telephone to operate as a television phone using an IP network, comprising:
a dial tone detection unit which detects dial tones sent from a communication partner;
a video adapter unit which connects and disconnects a video communication connection using the IP network, sends a video received from a video input unit to the communication partner and outputs a video received from said communication partner to a video output unit through said video communication connection in a connected state;
a translation table which describes correspondence between a plurality of dial tones and a plurality of setting/control items of control content; and
a main control unit which controls connection and disconnection of said video communication connection by said video adapter unit, according to a setting/control item corresponding to one of the dial tones detected by said dial tone detection unit, when said translation table stores said setting/control items content corresponding to said dial tones.

* * * * *